US006306296B1

(12) United States Patent
Kerfoot

(10) Patent No.: US 6,306,296 B1
(45) Date of Patent: Oct. 23, 2001

(54) GROUNDWATER AND SOIL REMEDIATION WITH MICROPOROUS DIFFUSION APPARATUS

(76) Inventor: William B. Kerfoot, 49 Ransom Rd., Falmouth, MA (US) 02540

( * ) Notice: Subject to any disclaimer, the term of this patent is extended or adjusted under 35 U.S.C. 154(b) by 0 days.

(21) Appl. No.: 09/197,756

(22) Filed: Nov. 23, 1998

Related U.S. Application Data

(60) Division of application No. 08/638,017, filed on Apr. 25, 1996, now abandoned, which is a continuation-in-part of application No. 29/038,499, filed on May 5, 1995, now abandoned.

(51) Int. Cl.[7] .................................................. C02F 1/72
(52) U.S. Cl. ...................... 210/170; 210/192; 210/198.1; 210/205; 405/128
(58) Field of Search ............................. 210/90, 170, 192, 210/198.1, 199, 205, 209, 218, 220; 261/20, 22, 122.1; 405/128

(56) References Cited

U.S. PATENT DOCUMENTS

| 4,268,283 | | 5/1981 | Roberts | 55/189 |
|---|---|---|---|---|
| 4,360,234 | * | 11/1982 | Hsueh et al. | 137/13 |
| 4,614,596 | | 9/1986 | Wyness | 210/754 |
| 4,832,122 | | 5/1989 | Corey et al. | 166/266 |
| 4,844,795 | * | 7/1989 | Halwani | 210/188 |
| 4,941,957 | | 7/1990 | Zeff et al. | 204/157.3 |
| 5,080,805 | | 1/1992 | Houser | 210/722 |
| 5,120,442 | | 6/1992 | Kull et al. | 210/621 |
| 5,167,806 | * | 12/1992 | Wang et al. | 210/188 |
| 5,205,927 | | 4/1993 | Wickramanayake | 210/170 |
| 5,221,159 | | 6/1993 | Billings et al. | 405/128 |
| 5,248,395 | | 9/1993 | Rastelli et al. | 203/41 |
| 5,362,400 | * | 11/1994 | Martinell | 210/170 |
| 5,375,539 | | 12/1994 | Rippberger | 110/238 |
| 5,389,267 | | 2/1995 | Gorelick et al. | 210/758 |
| 5,398,757 | * | 3/1995 | Corte et al. | 210/170 |
| 5,402,848 | | 4/1995 | Kelly | 166/266 |
| 5,403,476 | * | 4/1995 | Bernhardt | 210/170 |
| 5,425,598 | | 6/1995 | Pennington | 405/118 |
| 5,427,693 | | 6/1995 | Mausgrover et al. | 210/739 |
| 5,472,294 | | 12/1995 | Billings et al. | 405/128 |
| 5,588,490 | | 12/1996 | Suthersan et al. | 166/370 |
| 5,620,593 | * | 4/1997 | Stagner | 210/170 |
| 5,664,628 | * | 9/1997 | Koehler et al. | 210/510.1 |
| 5,676,823 | * | 10/1997 | McKay et al. | 210/220 |
| 5,698,092 | | 12/1997 | Chen | 210/94 |

FOREIGN PATENT DOCUMENTS 2 185 901   8/1987  (GB) .

OTHER PUBLICATIONS

"Injectable Points for Sandy Soil Sparging System", W.B. Kerfoot, Ph.D., Abstract, Sep., 1992, pp. 1–11.
"A Software Guidance System Created for Vapor Extraction Systems", EPA HyperVentilate, Aug. 1992.
"The Application of a 3–D Model in the Design of Air Sparging Systems", Michael C. Marley et al., Eastern Ground Water Issues Proceedings, 1992.

(List continued on next page.)

Primary Examiner—David A. Simmons
Assistant Examiner—Betsey J. Morrison
(74) Attorney, Agent, or Firm—Fish & Richardson P.C.

(57) ABSTRACT

An apparatus for injection of a gas into aquifer is described. The apparatus includes a gas generator that generates gas such as ozone for injection into the aquifer. The apparatus includes a casing and a packer disposed through the casing. An air injection passageway disposed through the packer and coupled to the gas generator. A pump is disposed within the casing and have an inlet above the packer and an outlet below the packer. The casing has an outlet screen that has a pore size less than about 200 microns. The apparatus has a microporous diffuser coupled to the gas generator, said microporous diffuser including a body having a porous portion with a pore size less than about 200 microns.

41 Claims, 28 Drawing Sheets

OTHER PUBLICATIONS

"Laboratory Study of Air Sparging: Air Flow Visualization", Wei Ji et al., Fall 1993 GWMR, pp. 115–126.

"Growth and Decay of Groundwater–Mounds in Response to Uniform Percolation", M.S. Hantush, Water Resources Research, vol. 3, No. 1, First Quarter 1967, pp. 229–231.

"On–Site Sewage Treatment", Proceedings of the Third National Symposium on Individual and Small Community Sewage Treatment, ASAE Publication, Jan., 1982, pp. 229–223.

"Reaction of Ozone with Ethene and Its Methyl–and Chlorine–Substituted Derivatives in Aqueous Solution", P. Dowideit et al., Environ. Sci. Technol. 1998, 32, 1112–1119.

"Kinetics and Mechanism of the Reaction Between Ozone and Chlorinated Alkenes in the Aqueous Phase", C.E. McCormack, Abstract of a Thesis, 1995, 1995, pp. 2–1 to 2–22.

"Leachate Plume Management", E. Repa et al., Oct. 1985, pp. 8–8 to 8–50.

"Soil Gas Movement—Monitoring Under Natural and Remediation Conditions", Remediation of Hazardous Waste Contaminated Soils, W.B. Kerfoot, 1994, pp. 791–828.

"Soil Remediation Workshop", P.C. Johnson et al., Shell Development, 1990–92.

* cited by examiner

50 MICRON BUBBLES

EXTENDED SLOT .010 in. PVC WELL SCREEN

MICROPOROUS DIFFUSER

STANDARD WELL SCREEN

| Mean Bead Diameter (mm) | Pore Space (microns) | Permeability (Darcy) | Gas Conductivity (cm/sec) | Equivalent Soil Classification |
|---|---|---|---|---|
| 2.000 | 860 | 1000 | 1.000 | Very coarse sand |
| 1.200 | 516 | 250 | 0.250 | Coarse sand |
| 0.655 | 281 | 147 | 0.147 | Medium coarse sand |
| 0.327 | 140 | 85 | 0.085 | Medium sand |
| 0.167 | 72 | 22 | 0.022 | Fine-medium sand |
| 0.083 | 36 | 9 | 0.009 | Fine sand |
| 0.041 | 18 | 5 | 0.005 | Very fine sand |
| 0.020 | 9 | 2 | 0.002 | Very fine silty sand |

Modified from Anderson, et.al., 1987[2]

FIG. 9

GROUNDWATER AND SOIL REMEDIATION WITH MICROPOROUS DIFFUSION APPARATUS

CROSS-REFERENCE TO RELATED APPLICATIONS

This application is a DIVISIONAL application of U.S. patent application Ser. No. 08/638,017 entitled Groundwater and Soil Remediation with Microporous Diffusion Methods and Apparatuses of William B. Kerfoot, filed Apr. 25, 1996, now abandoned, and a Continuation in Part of of U.S. patent application Ser. No. 29/038,499, entitled Bubbler Sparge Unit For Groundwater Treatment of William B. Kerfoot, filed on May 5 1995, now abandoned, which are incorporated herein by reference.

BACKGROUND OF THE INVENTION

1. Field of Invention (Technical Field)

The present invention relates to sparging apparatuses and methods of in situ groundwater remediation for removal of dissolved chlorinated hydrocarbons and dissolved hydrocarbon petroleum products. Remediation of saturated soils may also be obtained by employment of the present invention. In particular the present invention employs microporous diffusers injecting duo-gas bubbles into aquifer regions to encourage biodegradation of leachate plumes which contain biodegradable organics, or Criegee decomposition of leachate plumes containing dissolved chlorinated hydrocarbons.

2. Background Prior Art

The introduction of air bubbles into aquifers for the purpose of remediation is a recent advancement in in-situ treatment of groundwater. (Marley, et. al, 1992; Brown et. al., 1991). Contained air entrainment has been used for many years to provide vertical movement of water in low-head aquariums and in the development of public well supplies (Johnson, 1975). Aeration of aquifers for plume management was suggested to accelerate bacterial degradation of dissolved organic compounds (JRB, 1985). As the bubble volume increases in density above re-aeration needs by approaching ratios beyond 1 to 10 (1 water to 10 air), gas transfer begins to dominate. In this case, volatile organics may be physically transported from the saturated aquifer to the overlying unsaturated zone (vadose zone).

There is a well recognized need for a simple test to evaluate a potential site to assist with design of sparging systems deployed on a remediation site. Whereas hydraulic tests have been performed for some period of time based upon the well known Theis equation, the introduction of air bubbles (particularly microscopic bubbles) is new. Also, whereas the introduction of air to the pressure vessel is continuous, the production of bubbles, particularly the microscopic variety, is a discrete discontinuous process. Bubbles, once generated, may take preferential pathways, determined largely by the substratum and secondarily by the introduction of pressure (Ji, et. al., 1993).

Applicant is aware of prior art devices that have used injection of air to facilitate biodegradation of plumes. In U.S. Pat. No. 5,221,159 to Billings shows injection of air into aquifer regions to encourage biodegradation of leachate plumes which contain biodegradable organics together with simultaneous soil vacuum extraction.

Also in U.S. Pat. No. 4,730,672, to Payne, there is disclosed a closed-loop process for removing volatile contaminants. However Payne deals only with volatile contaminants. Payne discloses a withdrawal well is surrounded by multiple injection wells. Pressurized air is injected into the ground water through the injection wells, and is withdrawn under vacuum from the withdrawal well whereupon contaminants are removed from the air stream and the air is then recycled through the system. The U.S. Pat. No. 4,588,506, to Raymond et al., discloses the injection of a diluted solution of hydrogen peroxide into a contaminated soil for enhancing biodegradation of organic contaminants in the soil. Raymond discloses intermittent spiking of the hydrogen peroxide concentration to eliminate biota to increase soil permeability. Raymond has the disadvantage of failing to deliver of oxygen throughout the system, and depends on a complicated process of hydrologic management of the subsurface which has rendered the process uneconomical.

However, notwithstanding the teachings of the prior art, there has not been shown a method of remediating a site in a controlled manner of poorly biodegradable organics, particularly dissolved chlorinated solvents without vacuum extraction, which is adapted to the specific site and at an economical cost. The present invention accomplishes this by employing microporous diffusers injecting duo-gas bubbles into aquifer regions to encourage biodegradation of leachate plumes which contain biodegradable organics which overcomes at least some of the disadvantages of prior art.

SUMMARY OF THE INVENTION

The present invention relates to injection of oxidizing gas in the form of small bubbles into aquifer regions to encourage in situ remediation of subsurface leachate plumes. The present invention is directed to sparging apparatuses and methods of in situ groundwater remediation for removal of dissolved chlorinated hydrocarbons and dissolved hydrocarbon petroleum products. Remediation of saturated soils may also be obtained by employment of the present invention. In particular the present invention employs microporous diffusers injecting duo-gas bubbles into aquifer regions to encourage biodegradation of leachate plumes which contain biodegradable organics, or Criegee decomposition of leachate plumes containing dissolved chlorinated hydrocarbons.

The following methods and apparatuses for removal contaminants from soil and an associated subsurface groundwater aquifer using microporous diffusers and duo-gas systems are particularly useful in that they promote extremely efficient removal of poorly biodegradable organics, particularly dissolved chlorinated solvents, without vacuum extraction, and wherein remediation occurs by destroying organic and hydrocarbon material in place without release of contaminating vapors.

In the present invention the groundwater and soil remediation system comprises oxidizing gas encapsulated in microbubbles generated from microporous diffusers matched to soil porosity. A unique bubble size range is matched to underground formation porosity and achieves dual properties of fluid like transmission and rapid extraction of selected volatile gases, said size being so selected so as to not to be so small as to lose vertical mobility. In order to accomplish a proper matching, a prior site evaluation test procedure is devised to test effectiveness of fluid transmission at the site to be remediated.

The advantage of controlled selection of small bubble size promotes rapid extraction of selected volatile organic compounds, such as PCE, TCE, or DCE with an exceptionally high surface to gas volume ratio. The dual capacity of the small production and rise time is matched to the short lifetime of an oxidative gas, such as ozone to allow rapid dispersion into water saturated geological formations, and extraction and rapid decomposition of the volatile organic material. The unique apparatus of the present invention provides for extraction efficiency with resulting economy of operation by maximizing contact with oxidant by selective rapid extraction providing for optimum fluidity to permit bubbles to move like a fluid through media which can be monitored.

The use of microporous sparging points provides a more even distribution of air into a saturated formation than the use of pressurized wells. A sparge system installed to remediate contaminated groundwater is made more cost-effective by sparging different parts of the plume area at sequenced times. Through the proper placement of sparge locations and sequence control, any possible off-site migration of floating product is eliminated. With closely spaced sparge points, water mounding is used to advantage in preventing any off-site escape of contaminant. The mounding is used to herd floating product toward extraction sites. In the present invention, the concept of sparge system manipulation is predicated upon a thorough knowledge of the features of the groundwater or saturated zones on a site selected for remediation. Balancing the volume of air to the system sparge loci enables control of sparging efficiency and balancing of any downgradient movement of a contaminated plume while remediation is accomplished. Critical to sparge system design and accomplishment of any of the above points is to initially perform a "sparge point test" for the purpose of evaluating the characteristics of the site for matching purposes.

Furthermore, the present invention overcomes the limitations expressed above of the prior technology. The invention employs the well recognized Criegee mechanisms which describes the gas/reaction of ozone with the incoming PCE, TCE and DCE, vinyl chloride into microbubbles produced by sparge points with the resultant products then hydrolyzed, i. e. react with water to decompose into HCl and $CO^2$. It is this physical/chemical reaction which produces the rapid removal rate employed by the present invention. (See reference Maston S 1986, "Mechanisms and Kinetics of Ozone Hydroxal Radical Reactions With Model Alafadic and Olanfadic Compounds", Ph.D. Thesis, Harvard University, Cambridge, Mass.)

Unlike the prior art, the contaminated groundwater is injected with an air/ozone mixture wherein microfine air bubbles strip the solvents from the groundwater and the encapsulated ozone acts as an oxidizing agent to break down the contaminates into carbon dioxide, very dilute HCl and water. This process is known as the C-Sparge process.

Accordingly, the object and purpose of the present invention is to provide microporous diffusers for removal of contaminants from soil and associated subsurface ground water aquifer, without requiring vacuum extraction.

Another object is to provide duo-gas systems to be used in combination with the microporous diffusers to promote an efficient removal of poorly biodegradable organics, particularly dissolved chlorinated solvents, without vacuum extraction.

A further object is to provide for economical and efficient remediation of contaminated groundwater by providing a calculated plan of sparging different parts of a plume area at sequenced times.

Yet a further object is to control off-site migration of floating product by employing a water mounding technique which effectively herds floating product to extraction sites.

Another object is to provide sparge system manipulation predicated on performance of a site evaluation test.

A further object is to provide that remediation occurs by destroying organic and hydrocarbon material in place without release of contaminating vapors to the atmosphere.

Yet a further object is to obtain economy of operation by maximizing contact with the oxidant to achieve selective rapid extraction.

Another object is to provide a sparge system providing for optimum fluidity to permit bubbles to move like a fluid through media.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 9 is an illustration of permeability of glass beads compared with permeability of soil fractions.

DETAILED DESCRIPTION OF THE PREFERRED EMBODIMENT

Figures 1, 2:
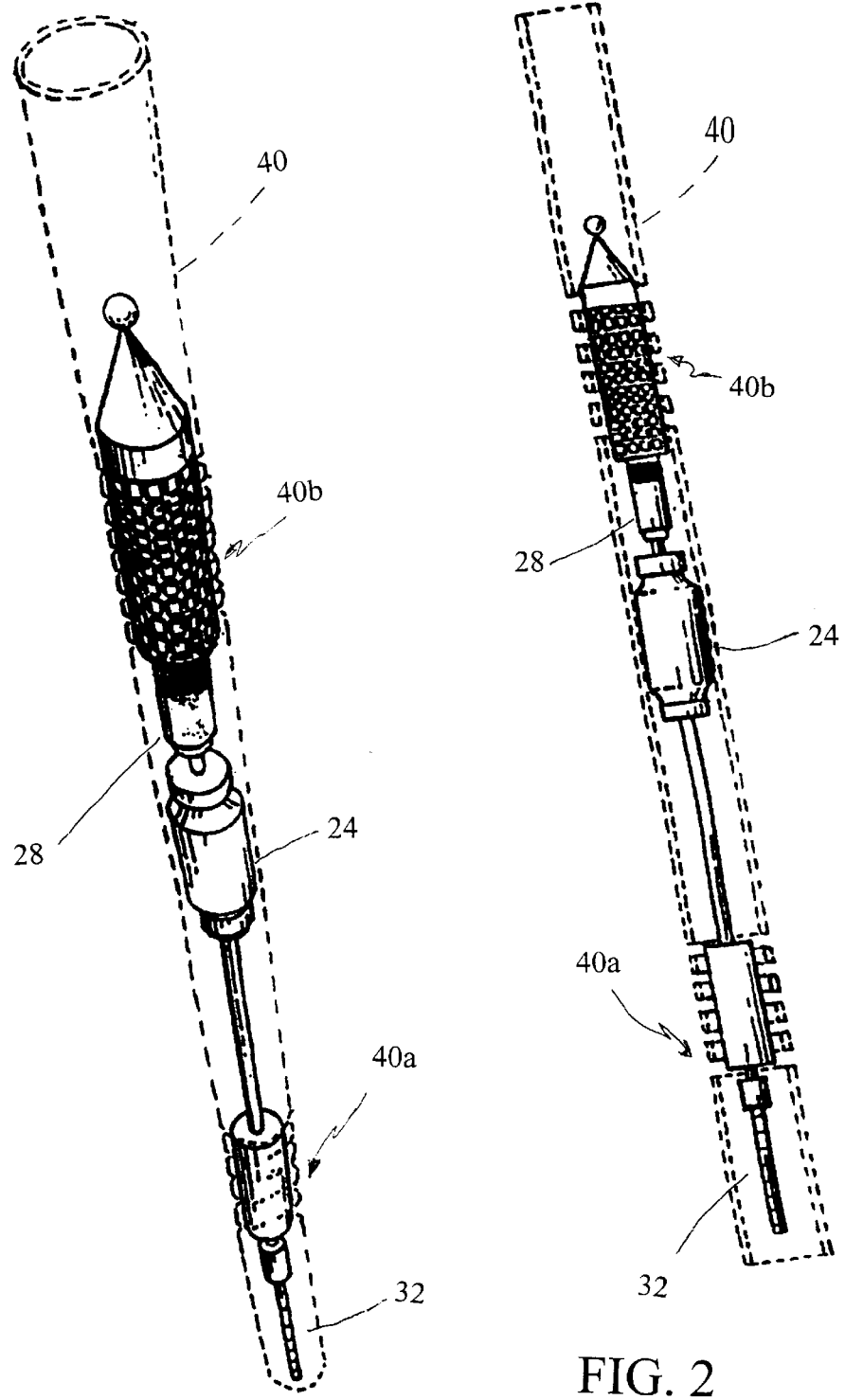
FIG. 1 is a perspective view of a Bubbler Sparge Unit for Groundwater Treatment shown disposed through a well casing in phantom.
FIG. 2 is a front view of the unit of FIG. 1.
Figure 3:
FIG. 3 is a top elevational view of the unit of FIG. 1.
Figure 4:
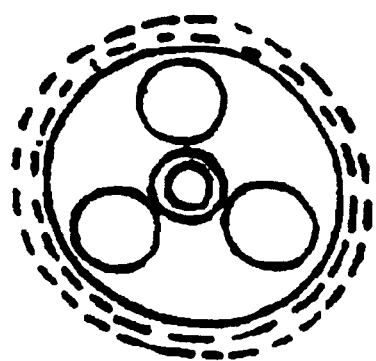
FIG. 4 is a bottom elevational view of the unit of FIG. 1.
Figure 5:
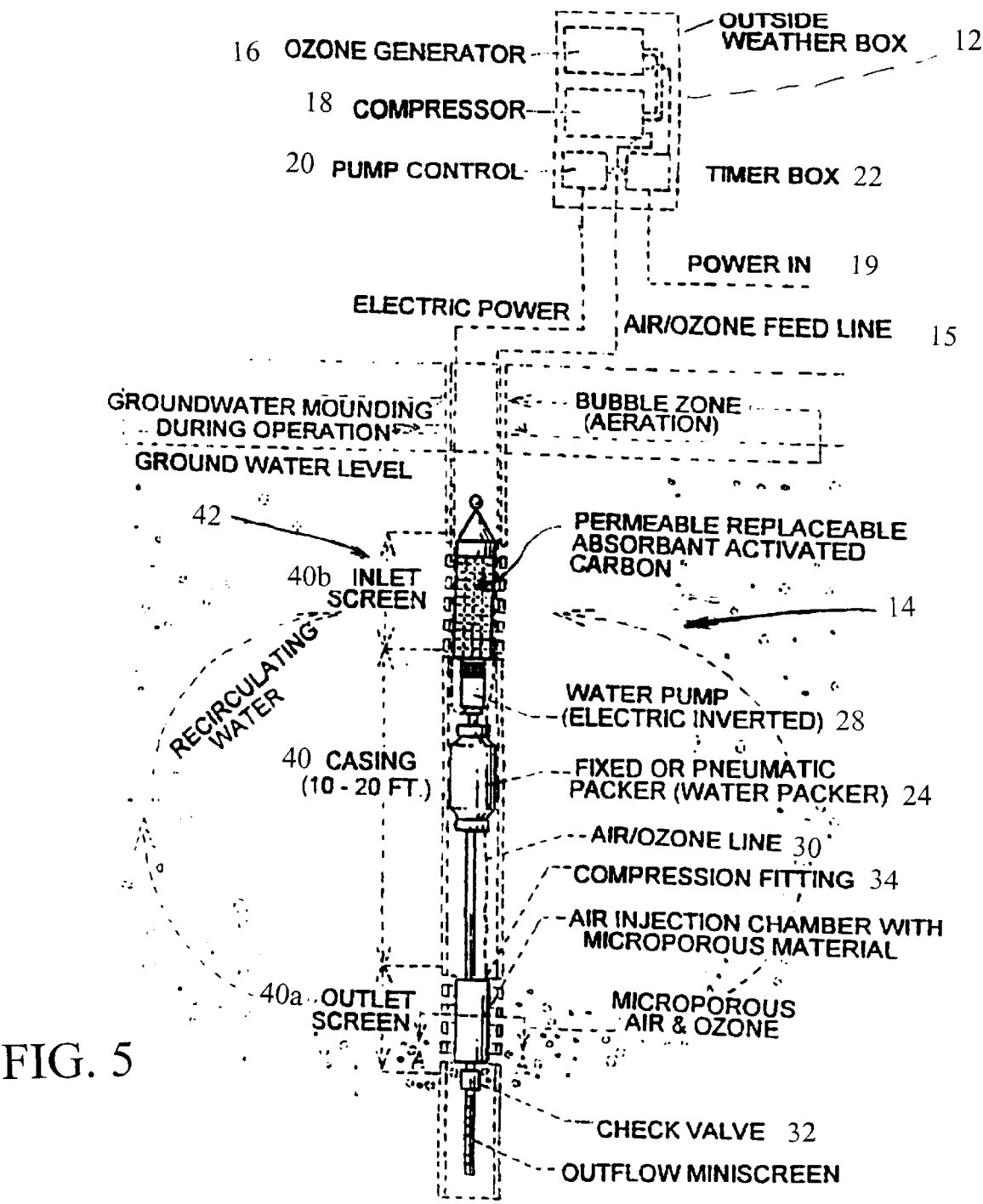
FIG. 5 is a front elevational view of the sparge bubbler unit in-situ for groundwater treatment.
Figure 6:
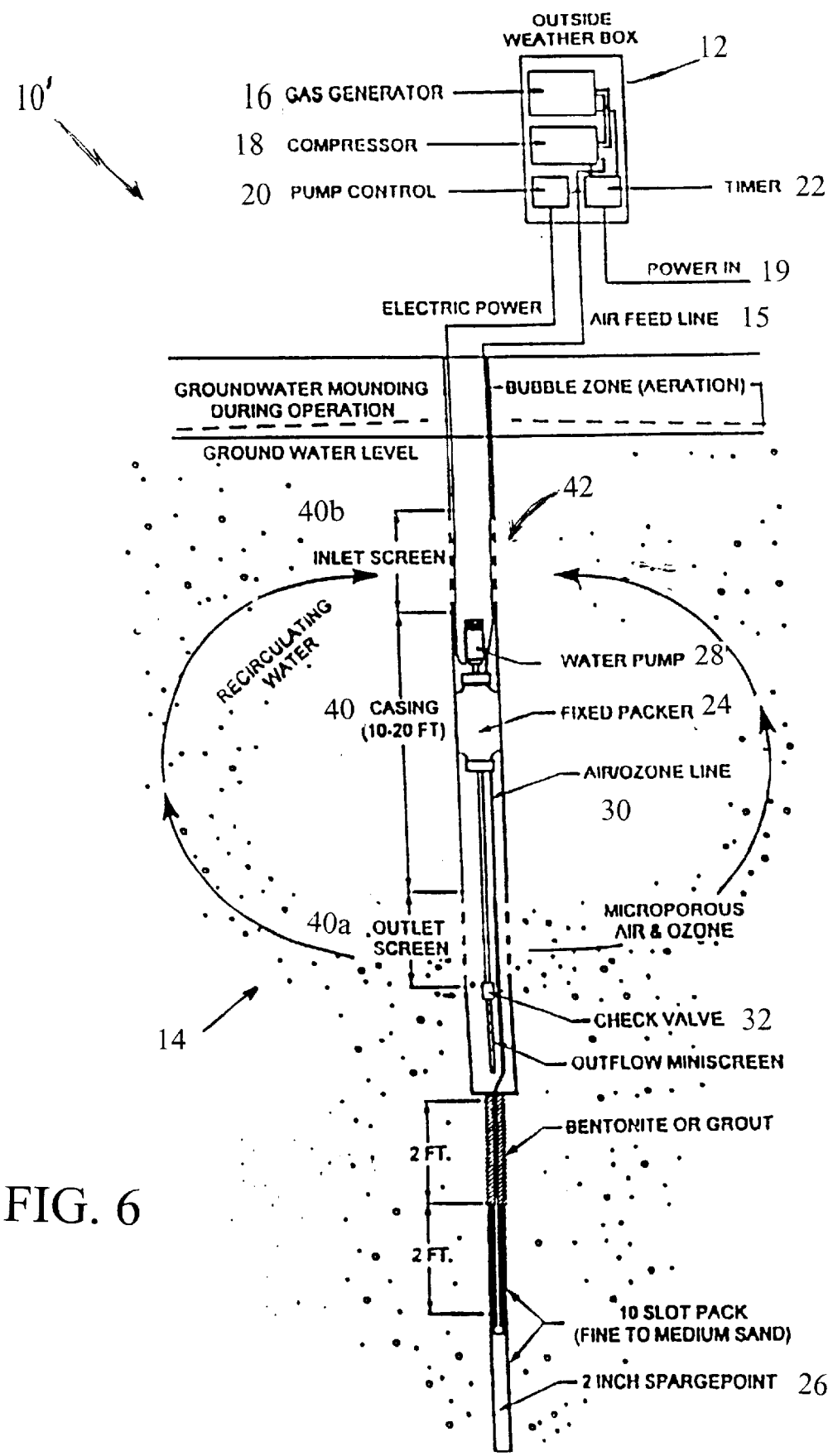
FIG. 6 is a cross sectional schematic illustration of a soil formation showing a well-screened implementation.
Figure 25:
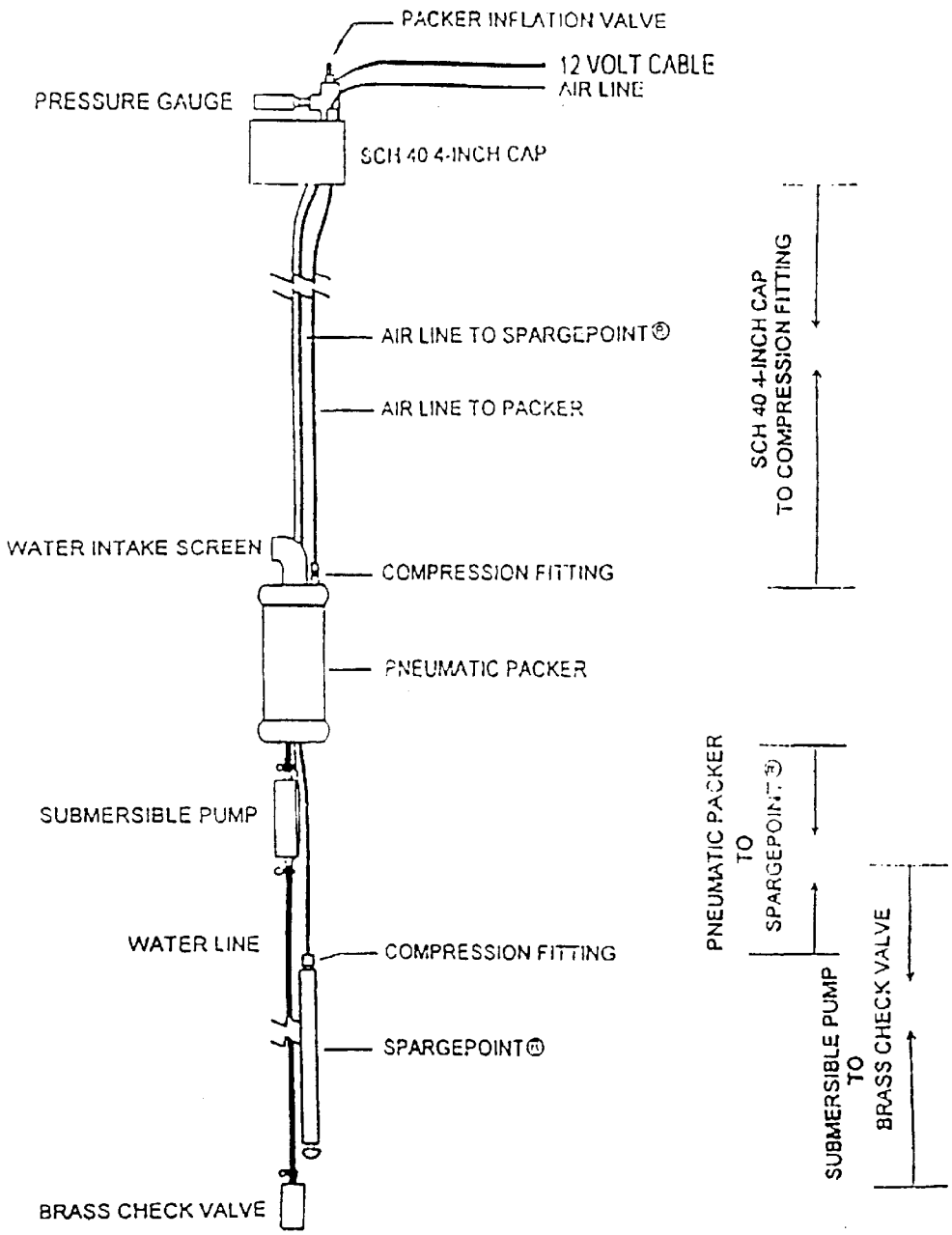
FIG. 25 is a cross sectional schematic illustration of an in-well assembly.

Referring to FIGS. 1–6 there is shown a c-sparge system 10. The system 10 includes a master unit 12 and one or more in-well assemblies 14. Each master unit 12 can operate up to a total of three wells simultaneously, and treating an area up to 50 feet wide and 100 feet long. Actual performance depends upon site conditions. Vapor capture is not normally necessary. Master unit 12 includes gas generator 16, compressor 18, pump control 20, timer 22, gas feed lines 15, and a power source 19. The In-Well unit 14 includes fixed packer 24, microporous diffuser, e.g., a Spargepoint™ 26, water pump 28, air/ozone line 30, check valve 32, and fittings 34. The master unit 12 is firmly mounted on 4×4 posts or building wall near the wells. A heavy-duty power cable 19, e.g., not over 50 feet in length, may be used to run from the power source to the master unit 12. The in-well unit 14 is disposed through a casing 40 in a well 42. The casing can have an inlet screen 40a and an outlet screen 40b, described below. The outlet screen produces microfine bubbles of air and ozone as the microporous diffuser (see also FIG. 25). FIG. 6 shows a similar installation with a second microporous diffuser, i.e., outflow miniscreen disposed in the casing adjacent the outlet screen.

Figure 11:
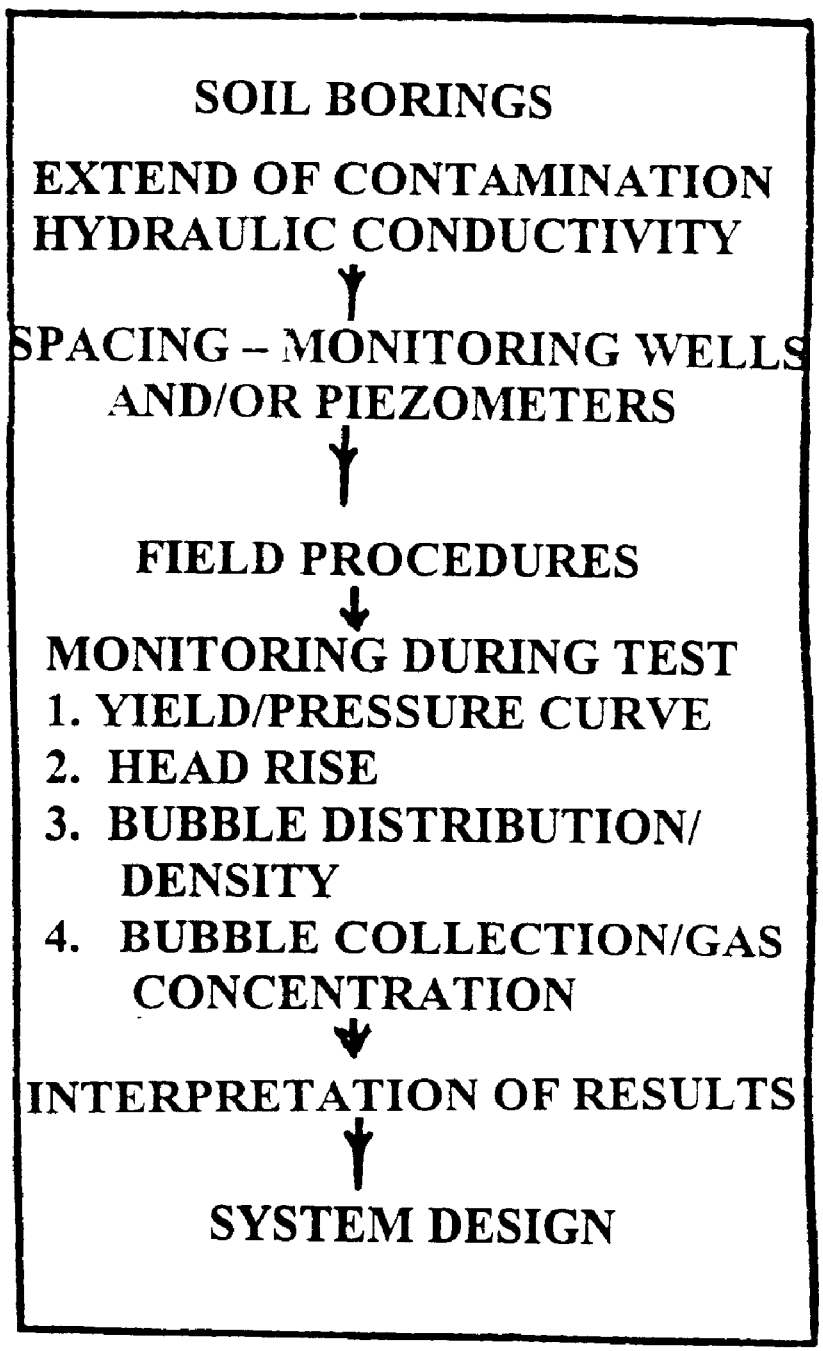
FIG. 11 is an illustration of flow chart for a sparge test.
Figure 12:
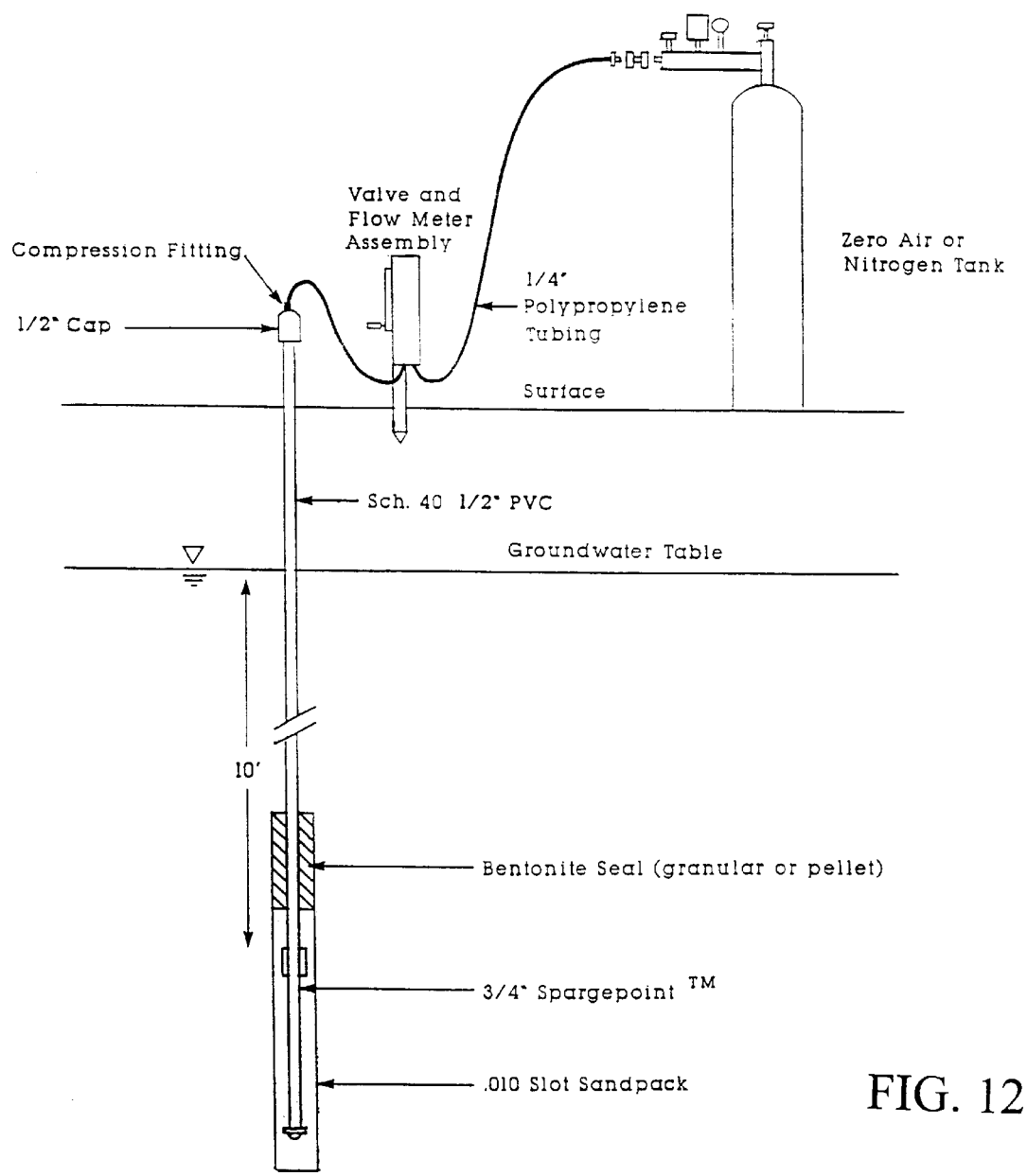
FIG. 12 is a schematic illustration of apparatus used in in-situ sparge test.

The following text describes a simple test that has proven useful in over 20 on-site tests to qualify an aquifer for sparging. The test uses a microporous ¾" Spargepoint™ which produces extremely fine bubbles, sized to penetrate fine sands (Kerfoot, 1993). The point may be injected with hydraulic or pneumatic hammers or inserted through a hollow stem auger, usually up to ten (10) feet below static water level. (See FIG. 11 for flow chart of a sparge test and FIG. 12 for apparatus.)

SITE PREPARATION

Prior to conducting a sparge test, reconnaissance steps are normally performed at a site. These steps include soil coring to establish the extent of volatile organic carbon (VOC) contamination, which yield the soil types with depth and hydrocarbon content (see P. Johnson, 1993), monitoring wells with or without bottom caps which are usually installed for later observation points, and well screens should extend five to seven feet below static water with one to three feet above, depending upon the historic record of water level changes. If floating nonaqueous liquid petroleum is observed (greater than sheen thickness), efforts to remove the product should be undertaken before sparge testing.

The corings are commonly scanned with a PID detector to establish the three-dimensional extent of petroleum contamination. Subsamples can be forwarded to a laboratory to determine precise chemical composition. A series of sieve analyses on recognizable sandy deposits may be valuable to establish size distribution and extent of fines (silts or clays).

The gradient, rate and direction of groundwater flow should be determined prior to sparge testing. Rapid flow often causes positional offset in the location of bubbles.

Basic hydraulic characteristics of the aquifer can be a valuable aid. There is a close correlation between hydraulic conductivity and bubble conductivity. Successful sparging tests have been conducted within the range of 101 to $10^{-5}$ cm/sec conductivities, determined by pump tests or slug test approximations.

SPARGE POINT TEST PROCEDURE

Prepare a site map, noting the distances between the test point and adjacent wells. Immediately prior to the test, check water elevation in monitoring wells and/or point piezometers. The following is a list of the materials and a stepwise procedure (see FIG. 11) for conducting a sparge test with the microporous bubbler. (See FIG. 12 for assembly of parts.)

MATERIALS

¾-inch OD×18 inch, (for 0.5 inch ID schedule 90 PVC); Wellhead surface assembly, (¼ inch connections, 0–2.5 cfm); Gas tank regulator, (acetylene torch type, zero air or nitrogen, 0–100 psi adjustable, 0–3 cfm flow capacity, male ¼ inch NPT connector); Zero air tank (medium 500 cf 1500 to 2000 psi) 90 lbs.; ¼ inch compression fittings, ¼ inch copper tube.

PROCEDURE

A Connect ¼ inch NPT of flowmeter assembly to regulator output;

B. Test before connection to wellhead to check flow to 2–3 cfm, with tubing wide open:

1. Leave ¾-inch NPT wellhead connector off;
2. Shut valve (b) on regulator, open valve on flowmeter;
3. Adjust pressure to 20 psi;
4. Slowly open valve (b);
5. Briefly check flow up to 2–3 cfm;

Shut down by turning valve (b) off.

C. Connect ¼ inch compression fitting to wellhead stickup 0.5 inch PVC pressure cap (either glue or screw top to casing, leaving enough for later completion);

D. Bring pressure down to 10 psi;

1. Slowly open valve (b);
2. Check flow (yield) on flowmeter, in cfph (cubic ft. per hour). Divide by 60 to get cfm.

Suggested well locations are at 5, 10, 15, and 20 feet from point of bubble injection. The screen should be five (5) feet, with two (2) feet placed into the unsaturated (vadose) zone and 3 feet below static water level.

NOTE: Initially water may move out of wellpoint causing a period of time (1–2 minutes) before bubbling begins.

3. If yield is less than 0.3 cfm, increase pressure valve to 15 psi; maintain for 5 minutes opening valve b to maximum flow.
4. Maintain for 30 minutes if flow is near 0.5 cfm.
5. Check observation wells with electronic dip meter to record water levels at 15 minute intervals. Check surface with flashlight for bubbles reaching surface. Verify with transparent bailers. It normally takes 30 to 40 minutes for bubbles to appear.
6. After one hour, increase pressure by another 5 psi again opening valve (b) to maximum.
   a. Record maximum yield from flowmeter.
   b. Repeat procedure 1–6.
7. Record pressure and maximum flow, and confirm distance of bubbling out from the injection location.

Figure 13:
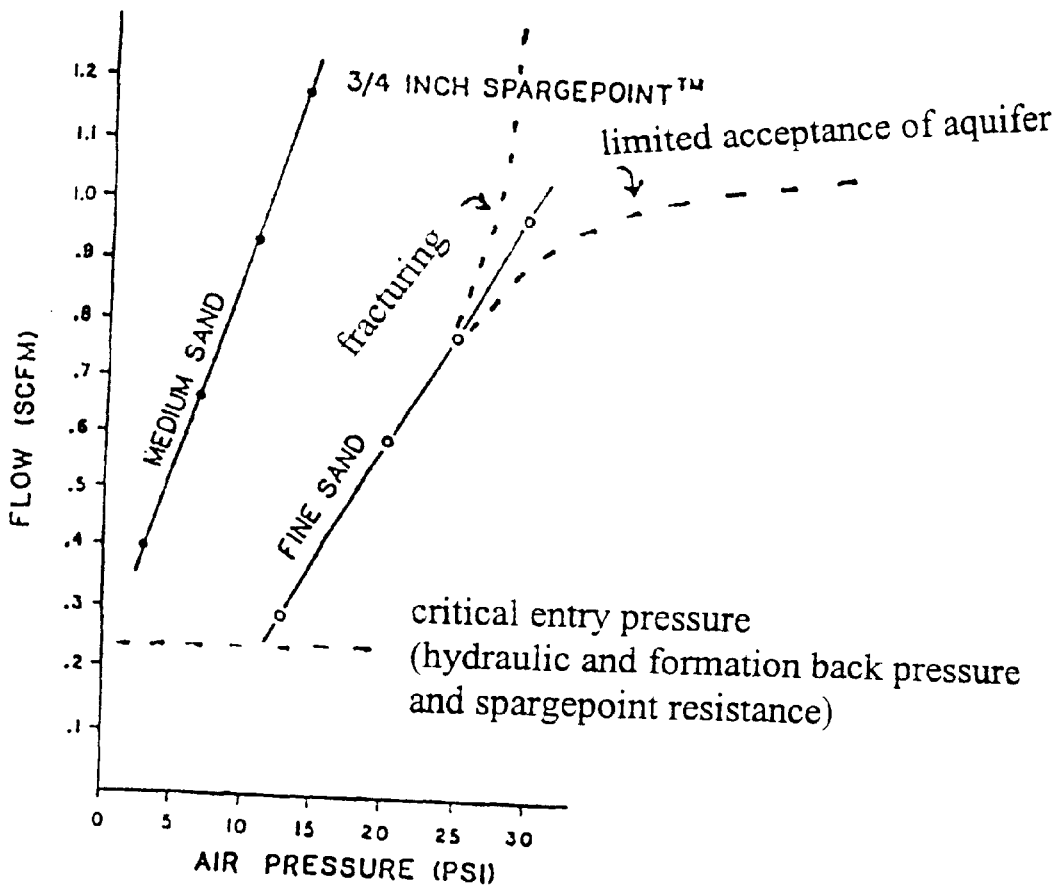
FIG. 13 is a graph illustrating pressure/flow relationship observed in different formations.

8. Continue with stepwise procedure recording pressure and yield; plot on graph paper. Record water elevations in wells and time of onset of bubbling. A test is usually conducted for a period of three hours, using about 150 to 200 cubic feet of gas.
9. After onset of bubbling, insert a bubble trap into the well. This allows quantification of the volume of gas being evolved into the unsaturated zone. A sample of the gas can be analyzed later to determine volatile mass transfer. As a substitute, count the number of bubbles present in a volume of water obtained with a bailer or peristaltic pump.
10. If you are dealing with silt or clay you may want to modify the procedure to increase pressure at 10 psi intervals up to 50 psi, as shown in FIG. 13. Check for fracturing by sudden change in slope upwards (increase in permeability). If bentonite or grout seal fails, flow also increases suddenly with a noticeable drop in water elevation in monitoring wells. Normally test is completed when 25 or 30 psi is reached or non-linear conditions are encountered.
11. In clay soils there may be substantial backpressure following cessation of test. Be careful unhooking lines. Wait until pressure reads below 20 psi before disengaging line or use a t-valve in line for venting.

INTERPRETATION OF RESULTS

Upon completion of a successful sparging test, there should be sufficient data to plot curves for the relationship between pressure and gas yield, zone of influence and bubble region. The injection of air into an aquifer closely approximates Darcian flow, as long as fracturing pressures are not exceeded. With microporous materials, the initial bubble can be sized below or matching the interparticle pore space, allowing gas conductivity to more approximate fluid conditions Kerfoot, 1993). The injection of air then approximates the more familiar injection of water, exhibiting mounding and outward movement until equilibrium is reached.

The creation of bubbling occurs when the gas pressure overcomes the hydraulic head (depth of water from static elevations to bottom of bubbler), the line friction, the membrane resistance of the bubbler wall, and the back pressure of the formation. The hydraulic head is converted to psi equivalents by multiplying depth of water by 0.43. The resistance of a half(½) inch tube is negligible under ten feet. The membrane resistance of a three quarter (3/4) sparge point is roughly two PSI. For a ten (10) foot installation, the critical bubbling pressure would be the following:

| | |
|---|---|
| Hydraulic head: 10 ft. × .43 = | 4.3 |
| Line Friction: Negligible = | .0 |
| Bubbler wall resistance: | |
| Critical Bubbling Pressure = | 2.0 |
| | 6.3 psi |

The most crucial pressure to overcome is the formation back pressure which varies with the surface to volume relationship of the pore spaces and the extent of their occlusion by fines. For a rough approximation, previous field tests have shown the following ranges:

| | |
|---|---|
| Gravel | .2 to 2 psi |
| Coarse sand | .3 to 4 psi |
| Medium sand | .5 to 6 psi |
| Fine sand | 1.0 to 10 psi |
| Silty sands | 3.0 to 30 psi |

Interstitial Gas: Velocity and Soil Conductivity

Gas is a fluid that, unlike water, is compressible. Vapor flow rates through porous material, such as soil, are affected by the material's porosity and permeability, as well as the viscosity, density, and pressure gradient of the gas. The movement of gas through soil can be approximated by Darcy's law. A simple formulation of Darcy's law for saturated gas flow in one dimension is:

$$V = \frac{V}{n} = \frac{q}{An} = \frac{k(dP/dm)}{un}$$

where:
V=seepage velocity (cm/sec)
V=gas yield $(cm^3)/(cm^2)(sec))$
q=flow rate $(cm^3/sec)$
k=gas permeability $(cm^2)$ (Darcies)
A=cross-sectional area $(cm^2)$
u=viscosity (g/(cm)(sec))
dP/dm=pressure gradient $(g/cm)(sec^2)/cm$
n=specific porosity (i.e., void nonwetted volume)

The simplified Darcy equation can be used in conjunction with simple vadose-zone well tests to directly relate soil permeability to gas viscosity, flow rate, and pressure gradient. By using direct gas velocity and rearranging the Darcy equation to solve for gas permeability (k), the following equation is derived and compared with its groundwater equivalent Masserman, 1989[3]:

$$\text{Gas flow: } k = \frac{Vn}{dP/dm}$$

$$\text{Groundwater equivalent: } K = \frac{Vn}{dh/dl}$$

The slope (dh/dl) change in water head with change in distance (dl) is replaced by the pressure gradient (dP/dm) in the soil gas equivalent. The solution for k can be found for a known gradient and porosity. Effective porosity (n) remains unchanged, except that moisture content must be considered with gas movement. The viscosity of air (u) is estimated from Table 1.

TABLE 1

| Viscosity of Air | |
|---|---|
| Temperature (° C.) | Viscosity (g/(cm)(sec))* |
| 0 | 0.000170 |
| 9 | 0.000176 |
| 18 | 0.000182 |
| 29 | 0.000186 |
| 40 | 0.000190 |

*The units are called poises.
Source: CRC 1972[4]

Petroleum engineers have defined the Darcy as a unit of permeability. Technically, one Darcy is defined as the permeability that will lead to a specific discharge (V) of 1 cm/sec for a fluid with a viscosity of 1 centipoise under a pressure gradient that makes the term pg/u (dp/dl) equal to 1 atmosphere, where p is density, u is viscosity, and g is the force of gravity. To convert Darcies to cm$^2$, multiply by 9.88×10$^{-9}$. To convert Darcies to gas conductivity in cm/sec, multiply by 9.11×10$^7$. To convert Darcies to cm/sec, divide by 10$^3$.

The differential equations that govern pressure flow of gas and vapor in soil are nonlinear since gas density depends upon gas pressure. Masserman 1989[3] has pointed out, however, that if the maximum pressure difference between any two points in the flow field is less than approximately 0.5 atmospheres, the differential equations developed to model groundwater flow provide good approximations of gas flow. Analytical models used to evaluate groundwater flow can then be designed to estimate gas flow in sandy soils. The particular uniqueness of injection of bubbles into an aquifer, (here a saturated sand deposit), is that bubbles rise upwards due to the density difference with water.

Following Darcy's Law, the rate of gas discharge from the sparge point increases proportionately to the pressure (head) applied above critical bubbling pressure. The outflow through the aquifer can be predicted by an analogy to the Darcy equation:

$$Q_o = K_8 A \frac{(hm - hx)}{x}$$

where $Q_o$=gas flow (cfm)

$K_g$=bubble conductivity

A=cross-sectional flow area (ft$^2$)

(hm-hx)=pressure head (ft)

x=distance from source (ft)

Since the area of a ¾ inch Spargepoint™ is fixed at 0.29 square feet, the gas yield is directly proportional to pressure. (A plot of pressure versus gas flow should be a straight line.) If, however, sufficient excessive pressure is applied to fracture the formation, thereby increasing its conductivity, the line will bend in the direction of more flow with less pressure. This creates an undesirable condition where a greater air volume can bypass soil without permeating through it. As a result, extraction efficiency drops rapidly as large channels are formed. Secondly, within confined aquifers or semiconfined aquifers. The cross-sectional area through which the air bubbles (fluid) is being injected may be limited having a ceiling or floor, and thereby limit the volume which can be injected.

Figure 7:
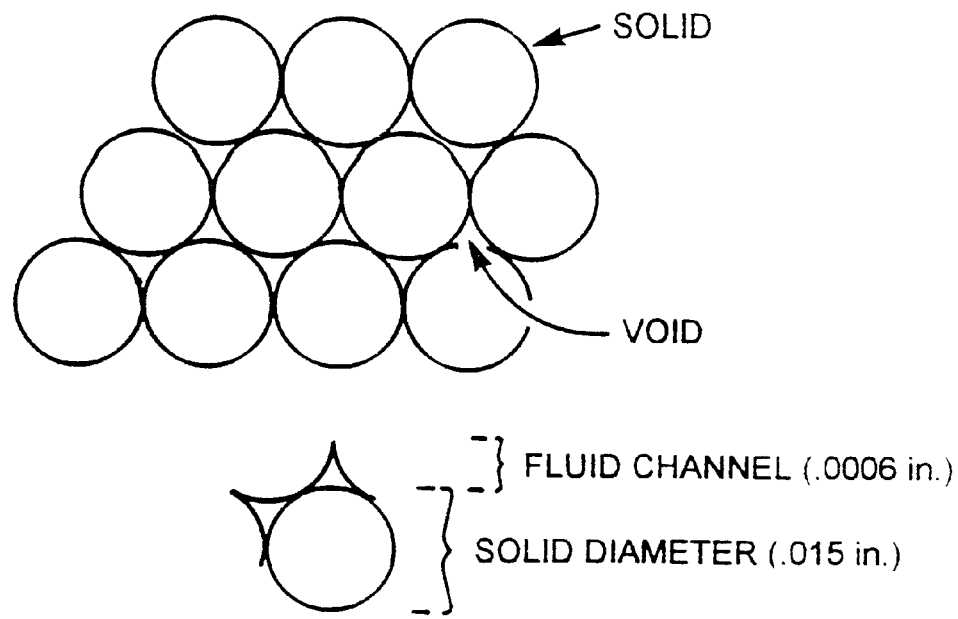
FIG. 7 is a graph illustrating pore size compared with air bubble size.
Figure 7:
Figure 7:
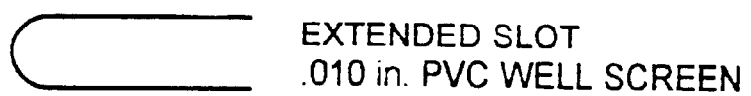
Figure 7:
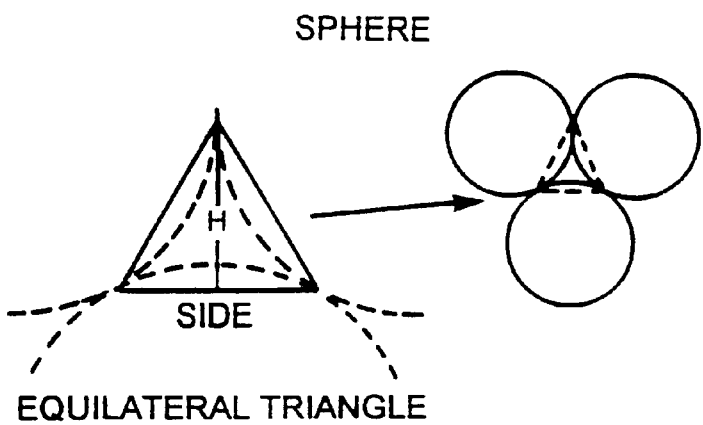
Figure 8:
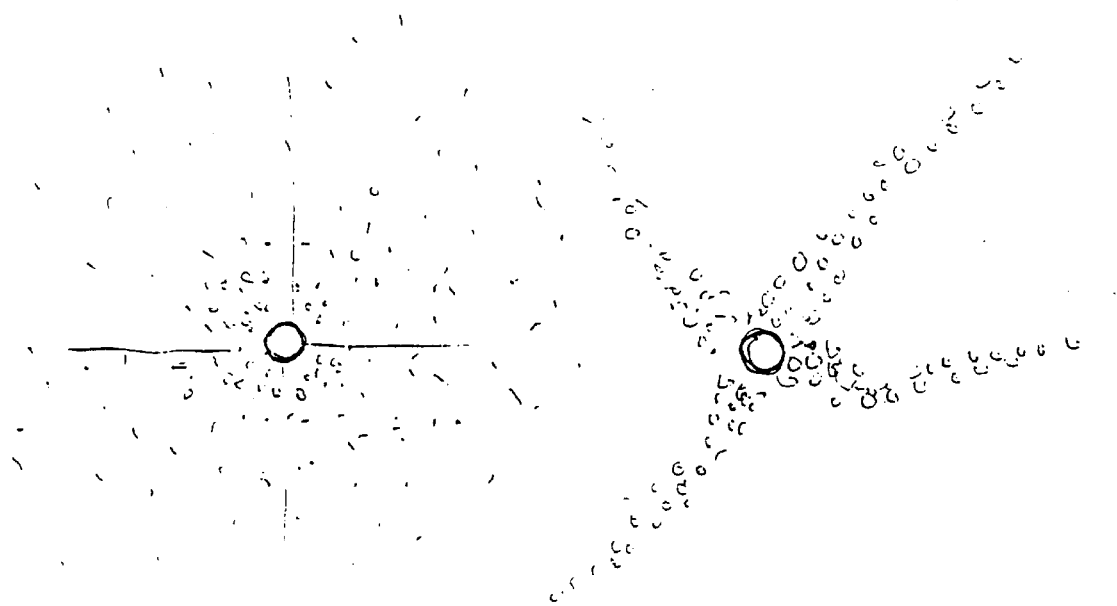
FIG. 8 is an illustration of radiation of bubbles from standard 0.010 (10 slot) well screen compared to microporous diffusor.
Figure 10:
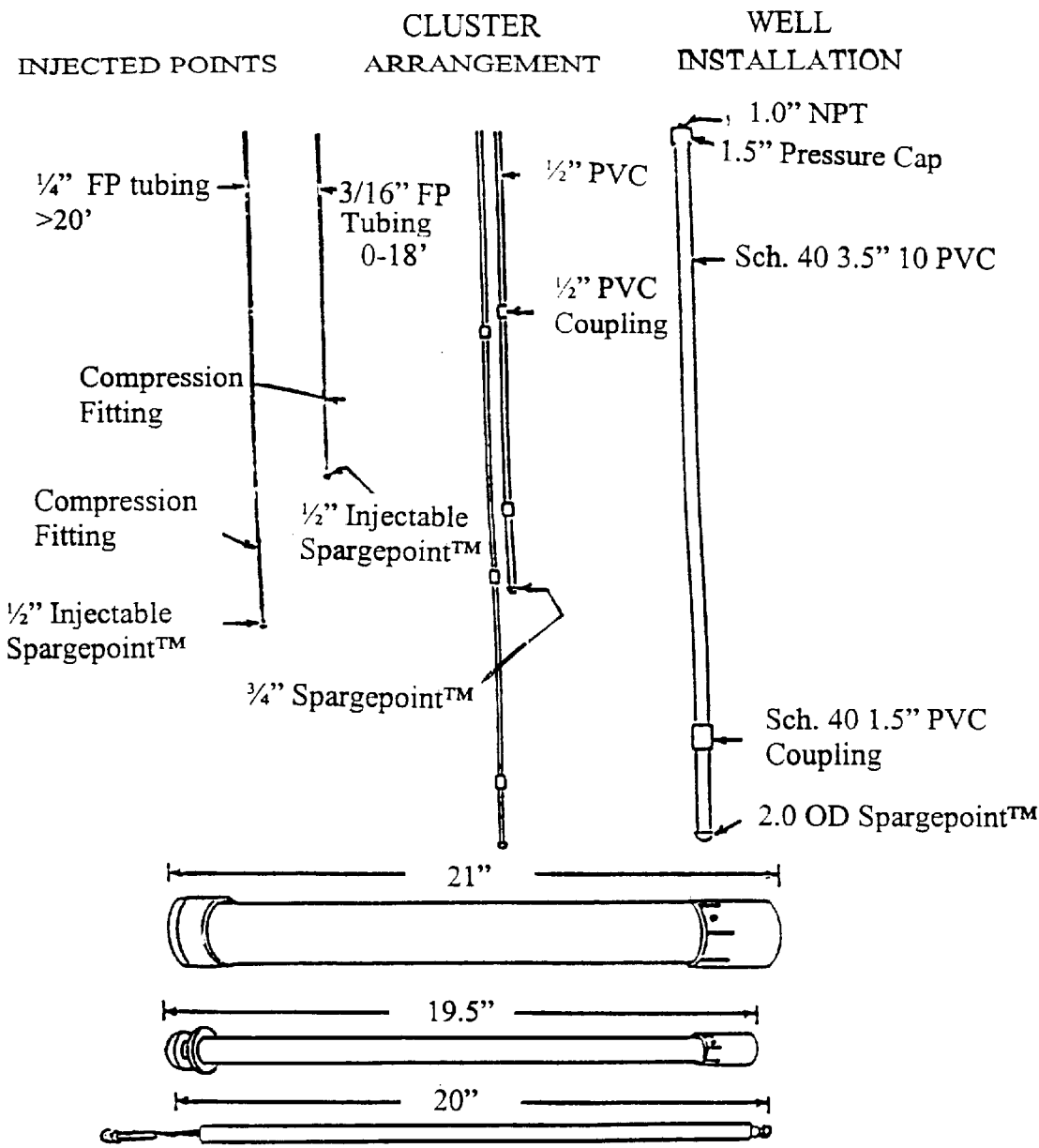
FIG. 10 is a plan view of three different types of sparge points.

Referring to FIGS. 7–9 there is shown the use of microporous diffusors in place of standard slotted well screen to improve bubble dispersion through soil and improve rate of gaseous exchange.

A normal 10-slot PVC well screen contains roughly twelve percent (12%) open area. Under pressure most air exits the top slits and radiates outwards in a starlike fracture pattern, evidencing fracturing of the formation.

The effectiveness of treatment is dependent upon uniformity of dispersion of the gas as it travels through the formation.

A porous structure with appropriate packing matches the condition of the pores of the soil with thirty percent (30%) pore distribution. The dispersion of bubbles as a fluid can be checked with Darcy's equation.

The use of microporous materials to inject gases into groundwater saturated formations has special advantages for the following reasons:

1. Matching permeability and channel size;
2. Matching porosity;
3. Enhancing fluidity, which can be determined in-situ.

The most effective range of pore space for the diffusor depends upon the nature of the unconsolidated formation to be injected into, but the following serves as a general guide:

1. Porosity of porous material: thirty percent (30%);
2. Pore space: 5–200 microns;
    a. 5–20 very fine silty sand;
    b. 20–50 medium sand;
    c. 50–200 coarse sand and gravel.

The surrounding sand pack placed between the spargepoint and natural material to fill the zone of drilling excavation should also be compatible in channel size to reduce coalescing of the produced bubbles.

The permeability range for fluid injection function without fracturing would follow:

1. 10$^{-2}$ to 10$^{-6}$ cm/sec, corresponding to 2 to 2000 Darcy's; or
2. 20$^{-2}$ to 10$^{-6}$ cm/sec; or
3. 100 to 0.01 ft/day hydraulic conductivity.

Permeability is the measure of the ease of movement of a gas through the soil. The ability of a porous soil to pass any fluid, including gas, depends upon its internal resistance to flow, dictated largely by the forces of attraction, adhesion, cohesion, and viscosity. Because the ratio of surface area to porosity increases as particle size decreases, permeability is often related to particle size.

An estimate of the permeability of a soil can be obtained by comparing its grain size in millimeters with glass beads of a similar size see Table 2. This method is generally limited to uniformly graded sands, i.e., sands with a uniformity coefficient of less than 5.0. Permeability (k) is a function only of the soil medium and is expressed as an area (cm$^2$).

TABLE 2

Permeability of Glass Beads Compared with Permeability of Soil Fractions

| Mean Bead Diameter (mm) | Pore Space (microns) | Permeability (Darcy) | Gas Conductivity (cm/sec) | Equivalent Soil Classification |
| --- | --- | --- | --- | --- |
| 2.000 | 860 | 1,000 | 1 | Very coarse sand |
| 1.200 | 516 | 250 | 0.250 | Coarse sand |
| 0.655 | 281 | 147 | 0.147 | Medium coarse sand |
| 0.327 | 140 | 85 | 0.085 | Medium sand |
| 0.167 | 72 | 22 | 0.022 | Fine-medium sand |
| 0.083 | 36 | 9 | 0.009 | Fine sand |
| 0.041 | 18 | 5 | 0.005 | Very fine sand |
| 0.020 | 9 | 2 | 0.002 | Very fine silty sand |

Modified from Anderson, et. al., 1987[2]

EQUIPMENT

Microporous diffusor types are shown:

a. Direct substitute for well screen, 30% porosity 5–50 micron channel size resistance to flow only 1 to 3 PSI, can take high volume flow, needs selective annular pack (sized to formation). High density polyethylene or polypropylene is light weight, inexpensive.

b. Diffusor on end of narrow diameter pipe riser KVA 14-291. This reduces the residence time in the riser volume.

c. Shielded microporous diffusor which is injected with a hand-held or hydraulic vibratory hammer. The microporous material is molded around an internal metal (copper) perforated tubing and attached to an anchor which pulls the spargepoint out when the protective insertion shaft is retracted. Unit is connected to surface with 3/16 or 1/4 inch polypropylene tubing with a compression fitting.

d. Thin spargepoint with molded tubing can be inserted down narrow shaft for use with push or vibratory tools with detachable points. The shaft is pushed to the depth desired, then the spargepoint inserted, the shaft is pulled upwards, pulling off the detachable drive point and exposing the spargepoint.

2. Use of a Site Test

SIMPLE TEST TO DETERMINE THE BUBBLING RADIUS AND BUBBLE CONDUCTIVITY OF AN AQUIFER

Referring to FIG. 13, the backpressure from the aquifer and radius of bubbling represents one of the major unknowns in the sparging system field design. The following test was designed and field tested to evaluate the capacity of the aquifer for sparging and to provide critical design information. A microporous bubbler of known characteristics is placed by injection or hollow stem auger a fixed distance below static water. A gas tank (zero air or nitrogen) with unlimited pressure and outfitted with a flowmeter provides the source of gas. The pressure is increased in a stepwise manner while observing flow. The yield versus pressure is then recorded. The shape of the curve indicates the pressure range of normal formation acceptance of flow under Darcian conditions and non-Darcian fracturing pressures.

Observation points away from the source use water table levels in both well screens and point piezometers. The rise in water level is recorded and the presence of bubbles noted. There is always a lag in time between bubble injection at depth and arrival at the surface. The yield curves and bubble zones are compared against theoretical and other curves observed for known formations.

MOUNDING

The phenomenon of groundwater mounding (FIGS. 18–22) occurs when a fluid is introduced into soil in unconfined sandy aquifers. Small bubbles displace an equivalent volume of water creating a movement of water horizontally and vertically. Hantush (1976) and Fielding (1981) have developed equations to depict two-dimensional behavior of groundwater in a constant- recharging system. Assuming a radial flow of bubbles in an aquifer of thickness (D), the head distribution can be represented as:

$$(hm - hx) = \frac{Q_o}{2K_8(D + hx)}$$

where $K_g$=bubble conductivity of aquifer (hm-hx)=pressure head (ft)

m=maximum water rise (ft)

D=depth of aquifer $\pi$=pi, a constant (3.14 . . .)

$Q_o$=gas outflow (cfd)

x=distance from source (ft)

In a theoretical depiction, the introduced bubbles exit the sparge point and migrate vertically resulting in a symmetrical spheroid shape. In reality, circular regions rarely are found. More commonly, an elliptical region is found, reflecting higher hydraulic conductivity in one axis than another, inherent with the depositional history of the formation. (See FIG. 19 for a depiction of groundwater mounding caused by sparging.)

BUBBLE RADIUS AND DISTRIBUTION

As with mounding, it is often convenient to think of bubble movement as being symmetrical and circular. In reality it is rarely so uniform. However, there are some general findings which can serve as guidelines in interpreting results of the bubble tests. First of all, bubbles in a more uniform sandy deposit move upwards at about a 45° angle when released at critical bubbling pressure. Doubling the depth doubles the radius. Unfortunately, stratified deposits may also be encountered which may divert bubble vertical movement.

Figure 14:
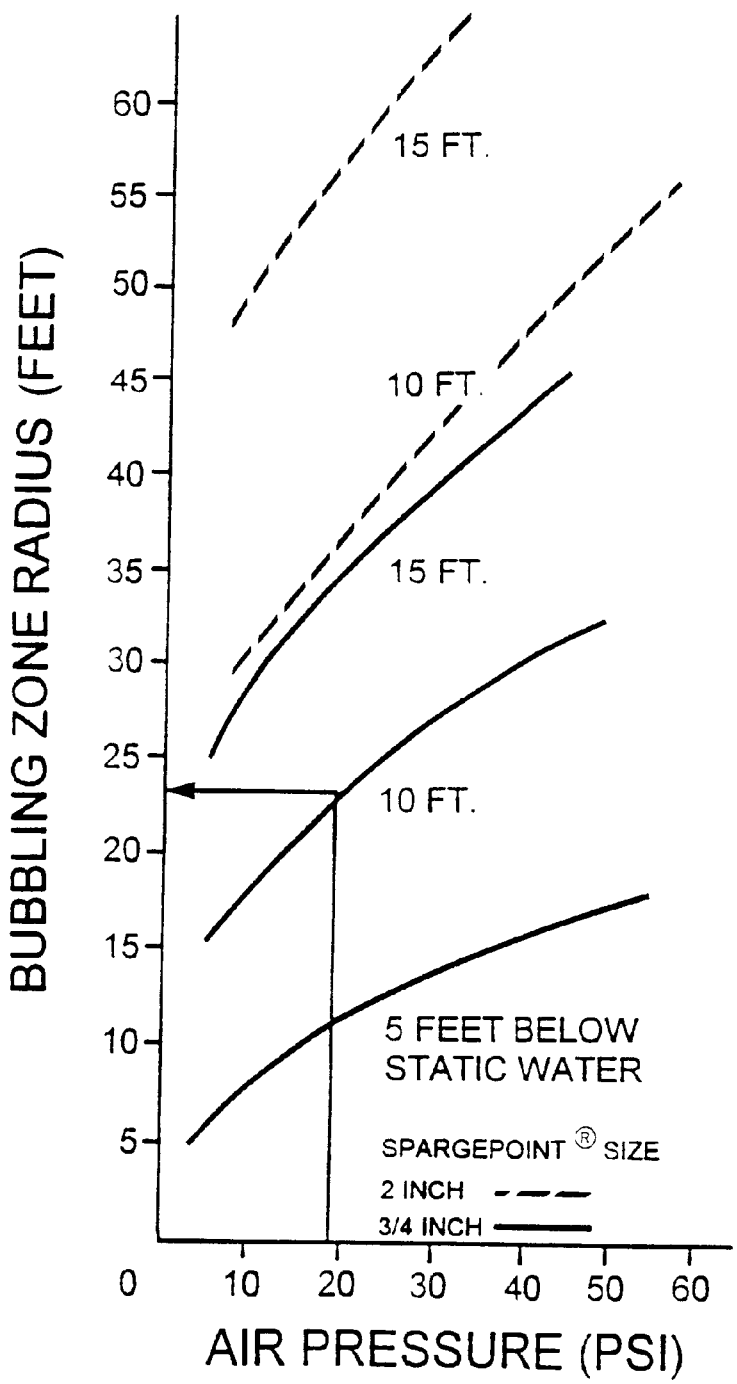
FIG. 14 is a graph illustrating influence of depth and pressure on radius of bubble zone.

For every doubling of pressure above critical bubbling pressure, the radius of influence will expand 1.42 times its original radius. This approximation is based upon maintaining a fixed thickness of aquifer while doubling the volume of the cylinder. An approximation of the relationship between depth, radius and pressure for a medium to fine sand is presented in FIGS. 14 or 20.

The relationship observed between depth of the bubbler and radius of the bubble zone with air pressure set to only 10 psi above critical bubbling pressure with a three quarter (3/4) inch diameter spargepoint, (Kerfoot, 1993.) The diameter observed for bubbling was noticeably less than the measured zone of influence of the displaced water. At ten feet below static water, a 10-foot pressure radius was observed at the top of the water when operated at critical bubbling. The radius of the observed bubble zone fit closely the relationship predicted by Repa and Kufs, 1985. At a fixed pressure set at 10 psi above critical bubbling, the radius expands linearly, (directly proportional), to increasing depth.

PRESSURE INFLUENCE

A second test was conducted on an 18-inch Spargepoint™ type microdiffuser located five (5) feet below static water. Pressure was increased in increments (5.0 psi) well above critical bubbling pressure (see FIG. 9.) Although the bubbling zone radius was five (5) feet at critical bubbling pressure, it expanded with increased pressure to approximately the square root of the pressure increase:

$$r = \frac{\text{Pressure}}{\text{Critical Pressure}} \wedge 0.5 \, dc$$

where r=radius of bubbling zone dc=depth of installation

PRESSURE VERSUS FLOW

As pressure increases, the gas flow to the Spargepoint™ also increases (see FIG. 9.) For comparison, the gas yield (flow) was measured with the bubbler in air, the main resistance being through the porous sidewalls of the cylinder. The sparge point was also placed in medium sand with less than one foot of water head. The same pressure was applied.

If the critical bubbling pressure is subtracted, the sand and water curve will show the expected flow in medium sand. For example, at a 10-foot depth (critical bubbling=7.8 psi) and 15 psi pressure, about 1.2 cfm would be expected.

If a fine porous diffuser (10 micron) is used with a highly permeable deposit (medium sand, 100 ft/day hydraulic conductivity), the resistance to flow may be so low that a shallow curve of pressure versus flow occurs. If so, assume that the radius of bubbling will increase by the square root of 2 (i.e., 1.4) times each time the flow volume is doubled.

DEGREE OF OVERLAP OF BUBBLE ZONES

Figure 23A:
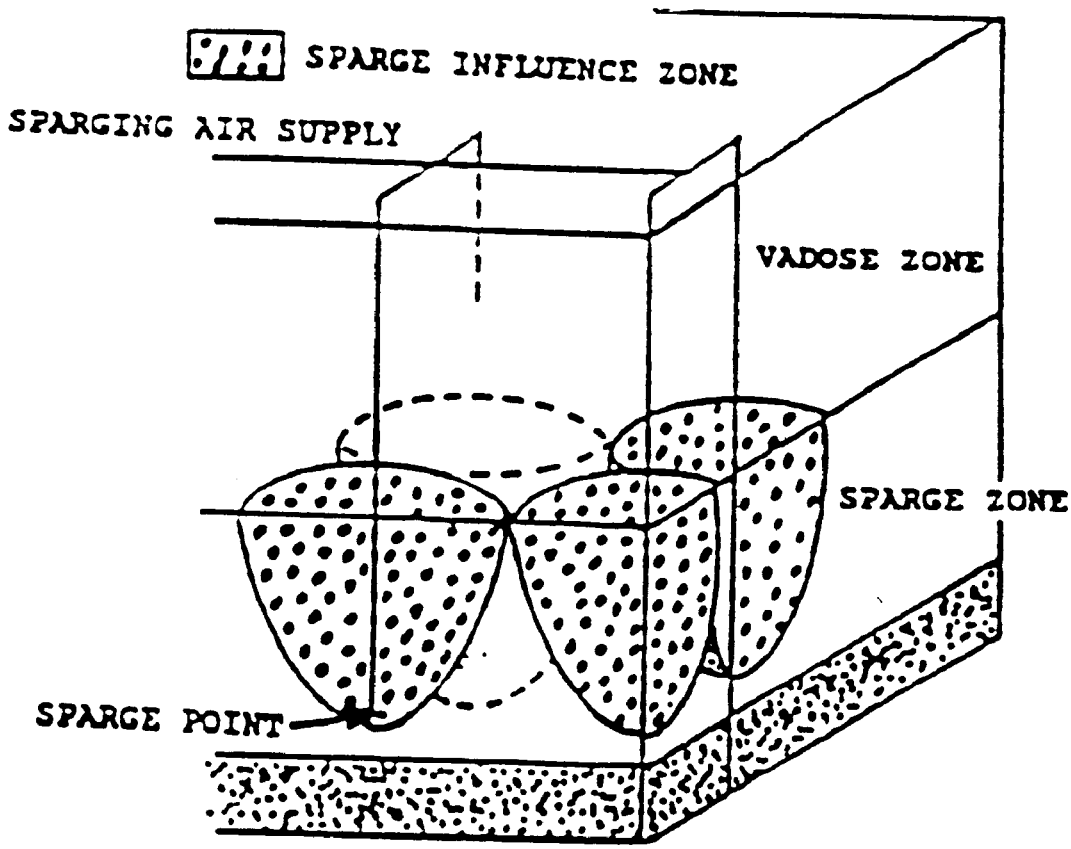
FIG. 23A is a schematic illustration of contrast between aeration gaps with non-overlapping and thirty percent (30%) overlapping sparged zones.
Figure 23B:
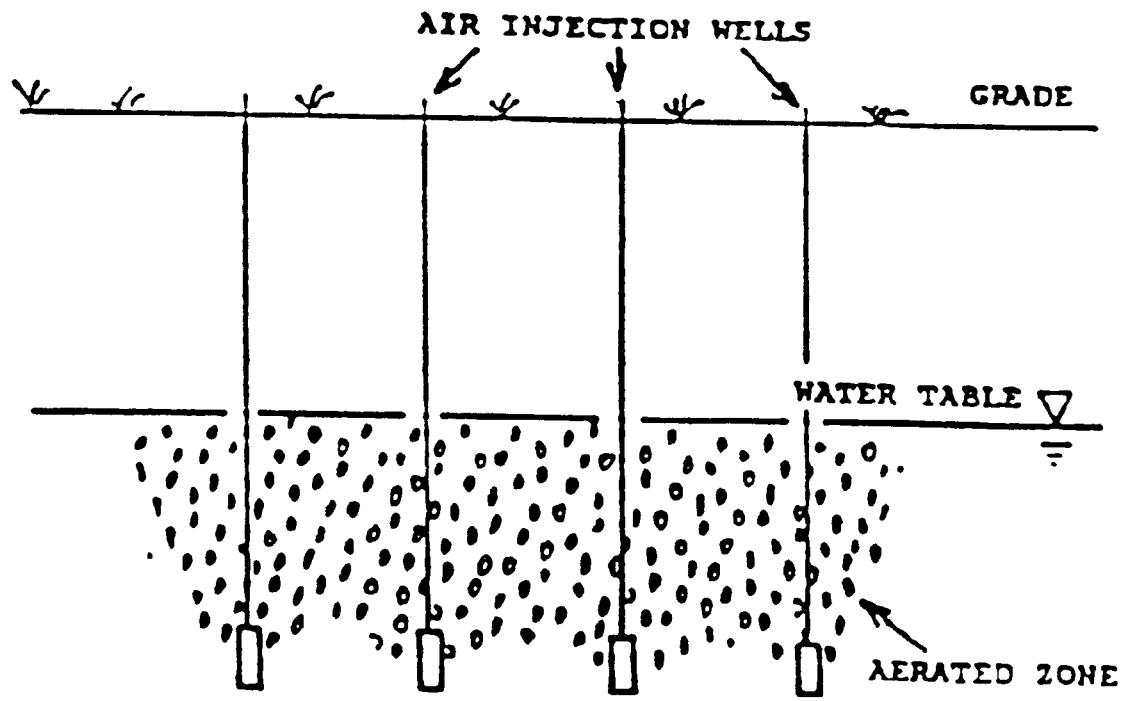
FIG. 23B is a cross sectional schematic illustration of an arrangement of units on a site.
Figure 24:
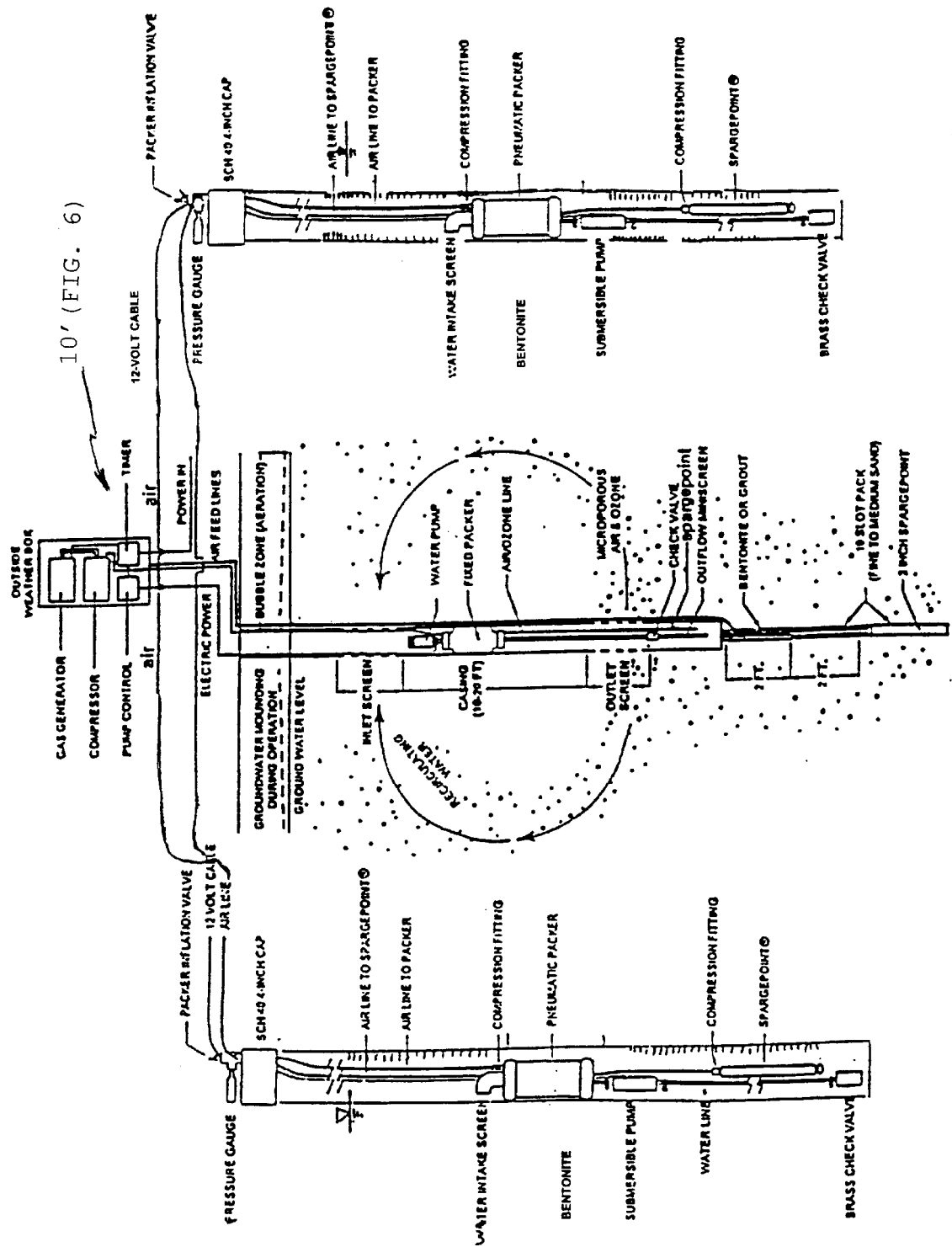
FIG. 24 is a plan view of a "C-Sparger" system.

It is important to achieve overlap of the zones of aeration. To achieve thirty percent (30%) overlap as shown in FIG. 23A, the distance between aeration zones should be set at ¾$d^b$ ($d^b$=the diameter of bubble zone), (see FIGS. 23B and 24). Table 4 presents a summary of guidelines for predicting the area of influence of the diffuser. (See FIG. 14) Table 4. Design Criteria for a Microporous Sparging System.

Air Sparging Design—Using Microporous Plastic Spargepoints Critical bubbling pressure (pressure to initiate bubbling) is defined as:

1. Pc (psi)=[0.43×Depth below Water (ft)]+3.5 (psi).

The diameter of the bubbling zone produced by the spargepoint when supplied with the critical bubbling pressure is equal to the installation depth of the microporous diffuser below the static groundwater surface:

1. Dc (ft)=Installation Depth below Water (ft).

The increase in the radius of the bubbling zone produced by the spargepoint when supplied with greater than the critical bubbling pressure is defined as:

| | | |
|---|---|---|
| a. | R = [Pressure/Pc]^0.5] × Dc; | |
| b. | Input Spargepoint depth below static groundwater level | 10.0 (ft); |
| c. | Critical bubbling pressure is calculated as | 6.0 (psi); |
| d. | Critical bubbling radius is calculated as | 20.0 (ft); |
| e. | Input proposed delivery pressure to spargepoints | 12 (psi); |
| f. | Bubbling zone radius based on input pressure 12.0 and volume (20 scfm) | 30 (ft); |
| g. | Recommended horizontal spacing between spargepoints | 22.0 (ft); |
| h. | Estimated air flow thru Spargepoint based on input pressure | 20 (cfm); |
| i. | Correction for vertical/horizontal (V/H) permeability if ratio of V/H is: 1. 1:1 multiply R by 1; 2. 1:10 multiply R by 1.5; 3. 1:100 multiply R by 2.0. | |

THE UNIQUE USE OF MICROFINE BUBBLES FOR SIMULTANEOUS EXTRACTION/DECOMPOSITION

The use of microporous Spargepoints™ type diffusers to create fine bubbles, which easily penetrate sandy formations to allow fluid flow, has unexpected benefits when used with multiple gas systems. Microfine bubbles accelerate the transfer rate of PCE from aqueous to gaseous state. The bubble rise transfers the PCE to the vadose zone. The ten-fold difference in surface-to-volume ratio of Spargepoint™ microbubbles compared to bubbles from standard well screens results in a four-fold improvement in transfer rates. To block the gaseous state from reverting to surface dissolved state in the vadose (unsaturated) zone, a microprocessor system shuttles an oxidizing gas through the vadose zone to chemically degrade the transported PCE.

GASEOUS EXCHANGE

If gaseous exchange is proportional to available surface area, with partial pressures and mixtures of volatile gases being held constant, a halving of the radius of bubbles would quadruple (i.e. 4×) the exchange rate. If, in the best case, a standard well screen creates air bubbles the size of a medium sand porosity, a microporous diffuser of 20 micron size creates a bubble one tenth (1/10) the diameter and then times the volume/surface ratio.

TABLE 3

| Diameter (microns) | Surface Area ($4\pi r^2$) | Volume ($4/3\pi r^3$) | Surface Area/Volume |
|---|---|---|---|
| 200 | 124600 | 4186666 | 0.03 |
| 20 | 1256 | 4186 | 0.3 |

Theoretically, the microporous bubbles exhibit an exchange rate of ten times the rate of a comparable bubble from a standard ten slot well screen.

PARTITIONING ENHANCEMENT

Soil Vapor concentrations are related to two governing systems: water phase and (non-aqueous) product phase. Henry's and Raoult's Laws (DiGiulio, 1990) are commonly used to understand equilibrium-vapor concentrations governing volatization from liquids. When soils are moist, the relative volatility is dependent upon Henry's Law. Under normal conditions (free from product) where volatile organic carbons (VOC's) are relatively low, an equilibrium of soil, water, and air is assumed to exist. The compound, tetrachloroethene (PCE), has a high exchange coefficient with a high vapor pressure (atm) and low aqueous solubility (umole/l). By enhancing the exchange capacity at least ten fold, the rate of removal should be accelerated substantially.

Figure 15:
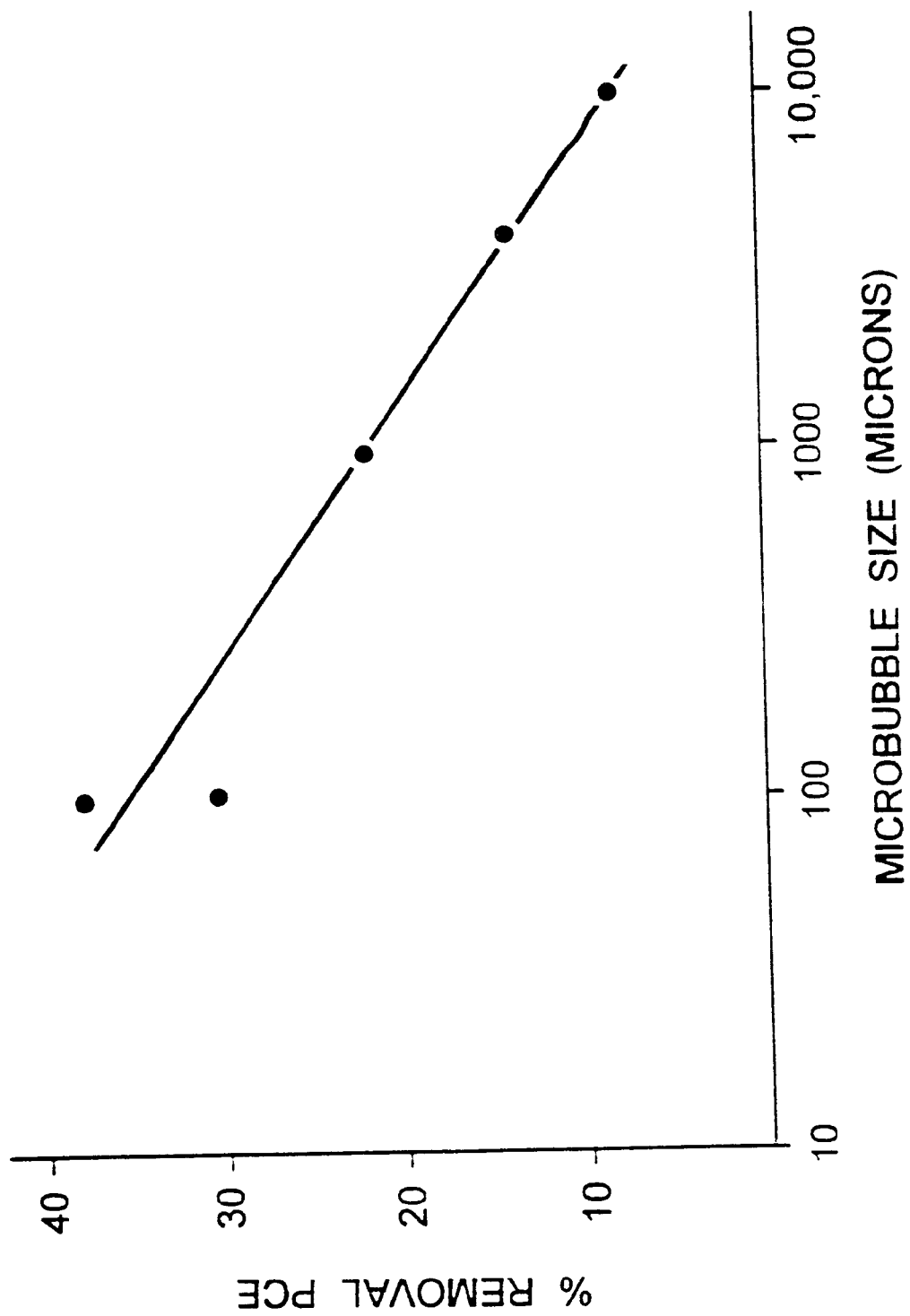
FIG. 15 is a graph illustrating PCE removal rate as function of bubble size.

FIG. 15 plots a curve of the removal rate of PCE for an aqueous solution equivalent to 120 ppb, subjected to differing bubble sizes. The air volume and water volume was held constant. The only change was the diameter of bubbles passed through the liquid from air released from a diffuser.

Ozone is an effective oxidant used for the breakdown of organic compounds in water treatment. The major problem in effectiveness is a short lifetime. If ozone is mixed with sewage-containing water above-ground, the half-life is normally minutes. Ozone reacts quantitatively with PCE to yield breakdown products of hydrochloric acid, carbon dioxide, and water.

To offset the short life span, the ozone could be injected with microporous diffusors, enhancing the selectiveness of action of the ozone. By encapsulating the ozone in fine bubbles, the bubbles would preferentially extract volatile compounds like PCE from the mixtures of soluble organic compounds they encountered. The ozone destruction of organics would then target volatile organics selectively pulled into the fine air bubbles. Even in a groundwater mixture of high organic content like diluted sewage, PCE removal could be rapid.

The unique combination of microbubble extraction and ozone degradation can be generalized to predict the volatile organic compounds amenable to rapid removal. The efficiency of extraction is directly proportional to Henry's Constant. Multiplying the Henry's Constant (the partitioning of VOC's from water to gas phase) times the reactivity rate constant of ozone for a particular VOC yields the rate of decomposition expected by the microbubble process.

Table 3 gives the Henry's Constants (Hc) for a selected number of organic compounds and the second rate constants (Rc) for the ozone radical rate of reaction. The third column presents the product of both (RRC).

TABLE 4

REMOVAL RATE COEFFICIENTS FOR THE MICROBUBBLE/OZONE PROCESS - C-SPARGE

| Organic Compound | Ozone Second order Rate Constant[b] ($M^{-1} SEC^{-1}$) | Henry's Constant[b] | Rate Removal Coefficient |
|---|---|---|---|
| Benzene | 2 | $5.59 \times 10^{-3}$ | .0110 |
| Toluene | 14 | $6.37 \times 10^{-3}$ | .0890 |
| Chlorobenzene | 0.75 | $3.72 \times 10^{-3}$ | .0028 |
| Trichloroethylene | 17 | $9.10 \times 10^{-3}$ | .1540 |
| Tetrachloroethylene | 0.1 | $2.59 \times 10^{-3}$ | .026 |
| Ethanol | 0.02 | $4.48 \times 10^{-3}$ | .0000008 |

$R_c \cdot H_c = RRC$

ELIMINATION OF THE NEED FOR VAPOR EXTRACTION

The need for vapor control exists when vapors of VOC's partitioned from dissolved form into the microbubbles, reach the unsaturated zone, releasing vapors. Without reaction with a decomposing gas, such as ozone, a large mass can be transmitted in a short time, creating potential health problems near residential basement areas.

The combined extraction/decomposition process has the capacity to eliminate the need for vapor capture. If the decomposition rate with ozone exceeds the vertical time-of-travel, vapors will not be produced or their concentration will be so low as to not require capture. By controlling the size of microbubbles and matching them to suitable slow rise times, the need for vapor control is eliminated.

The rise time of bubbles of different sizes was computed for water, giving the upwards gravitational velocity. The upwards velocity provides the positive pressure to push the bubbles through the porous media, following Darcy's equation. By timing the rise rate in the field; the rise time, proportional to upwards pressure, can be calculated.

| BUBBLE DIAMETER | UPWARD VELOCITY IN WATER | TIME (MINUTES) FOR UPWARDS MIGRATION (3 METERS) (Coarse Sand and Gravel) |
| --- | --- | --- |
| 10 mm | .25 m/s | 19 min. |
| 2 mm | .16 m/s | 30 min. |
| .2 mm | .018 m/s | 240 min. |

ELIMINATION RATE OF PCE RELATIVE TO OZONE CONTENT

The reaction of ozone with tetrachloroethene (PCE) will produce degradation products of hydrochloric acid, carbon dioxide, and water. By adjusting the ozone concentration to match the dissolved PCE level, the PCE can be removed rapidly without excess ozone release to the air or release of PCE vapor into the unsaturated zone.

The reaction of ozone and PCE in the air bubbles is a gas reaction. The molecular weight of PCE is 168 gm/mole; ozone is 48 gm/mol. A mass of 3.5 moles of $O_3$ are needed to react with 1 mole PCE. To calculate the concentration of gms/day ozone to match the removal need, the total mass of dissolved PCE in the treated water column is computed. Assuming a porous cylinder of 8 meters radius and 2 meters deep (contaminated zone), the liquid volume of medium sand, (0.30 porosity) is about 60,000 liters. If the mean PCE concentration is 100 ppb, 6.0 gm of PCE are contained within the cylindrical water column. From the gas transport sampling, an internal concentration of about 250 mg/l PCE as gas would occur with a microbubble passing through the water column. If:

TABLE 5

| $C_{pce}$ = 250 mg/l | 6 gms PCE |
| --- | --- |
| $O_3$ = 714.3 mg/l | 2.86 × |
| | 17 gms $O_3$ for conplete combustion |

If the unit produces 5 g/1440 minutes and it is operated 200 min/day, then 0.69 gms/day would be released. Dividing the grams PCE by the rate of production gives an approximation of removal rate, assuming good distribution of bubbles throughout the medium sand contaminated area.

TABLE 6

$$\frac{6 \text{ gms}}{.674 \text{ gms/day}} = 8.6 \text{ days for complete removal}$$

In reality, the reaction rate is proportional to concentration, i.e. it slows as concentration decreases.

USE OF SPECIALLY-DESIGNED WELLHEADS

Figure 16:
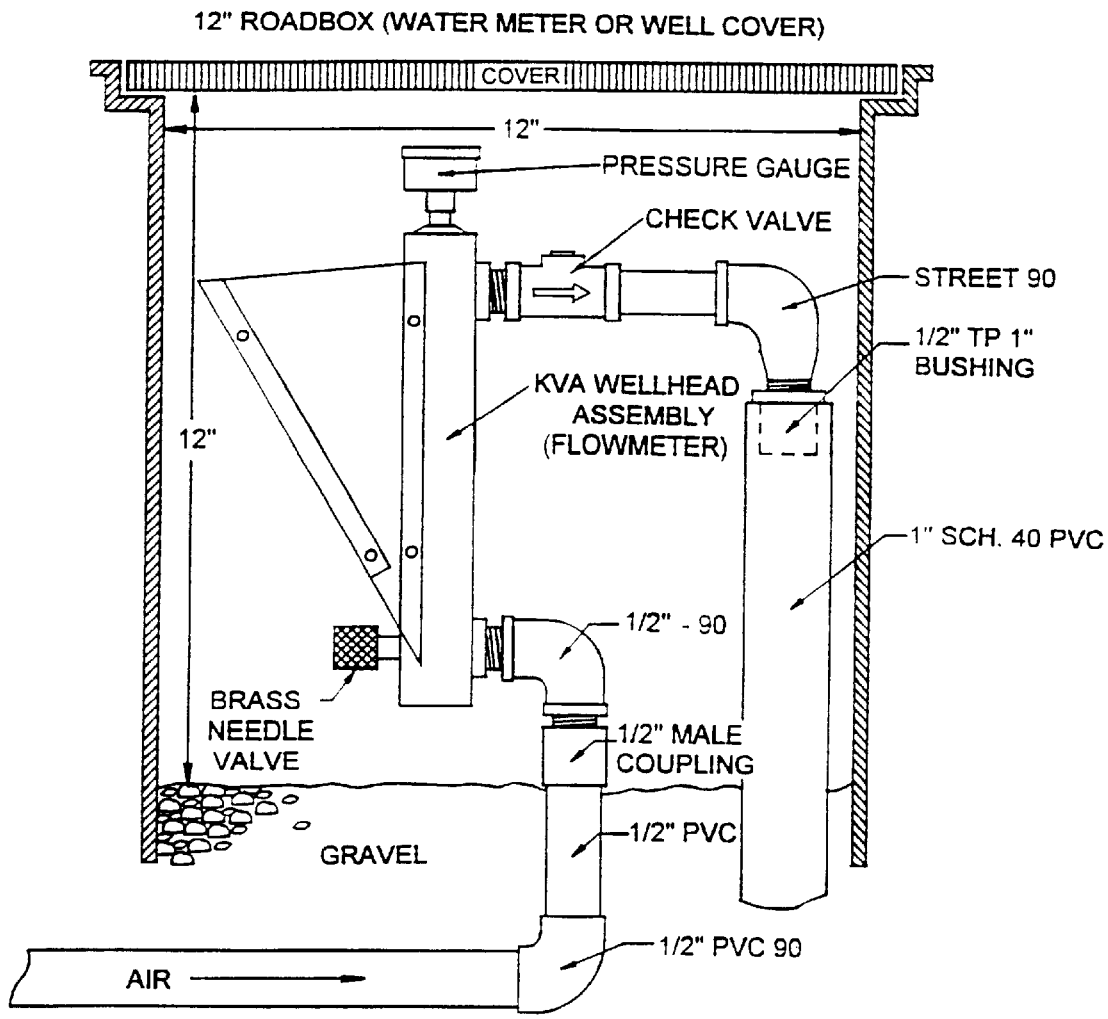
FIG. 16 is an illustration of flushmount wellhead assembly in roadbox.
Figure 17:
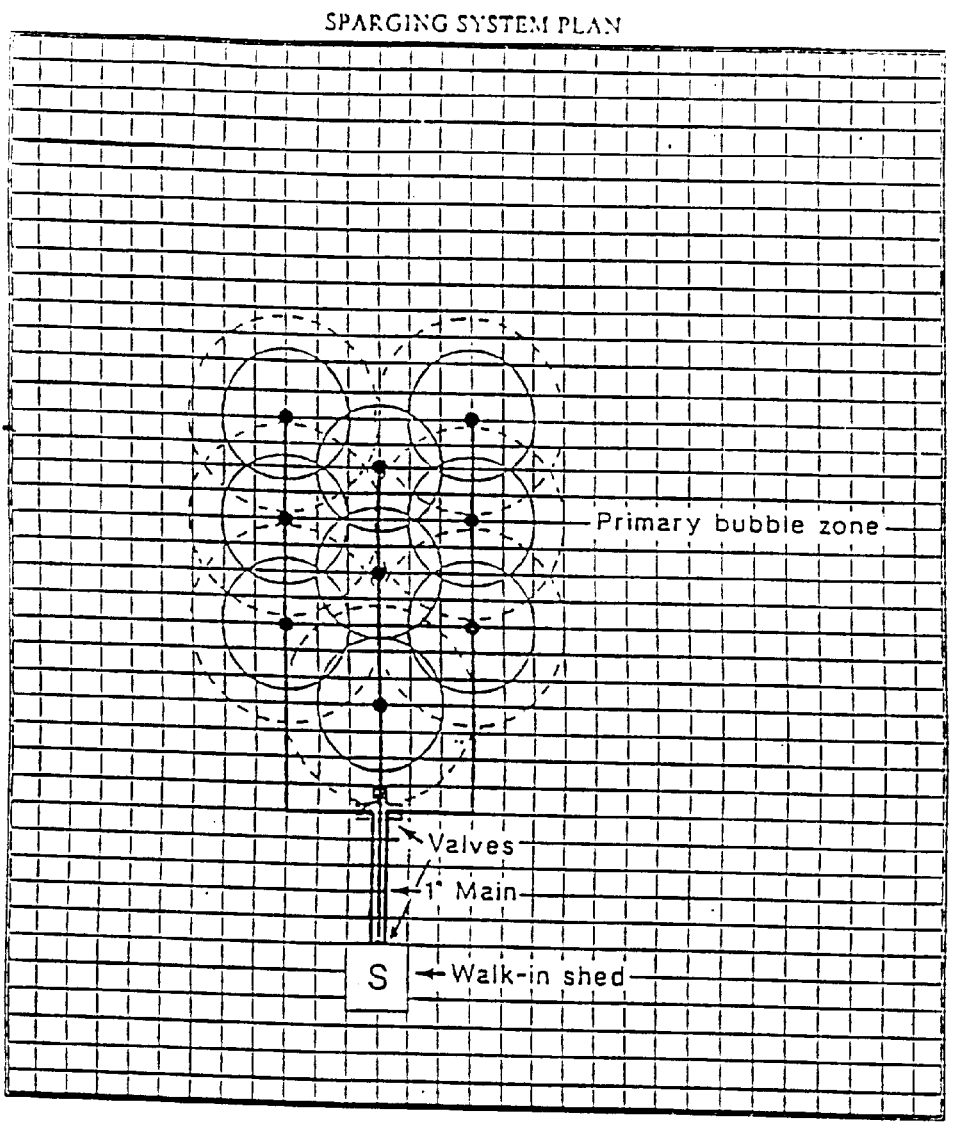
FIG. 17 is a schematic illustration of the use of zone control.

1. The hydraulic conductivity of saturated sandy formations may vary over a range of 1000 fold. In glacial outwash a fifty (50) fold range may be common in a short distance. If a series of microporous diffusers are placed at a fixed depth across formations of varying resistances, like fine sand (k=5 ft/d), medium sand (k=100 ft/d) and coarse gravel (k=1000 ft/d), the point in coarse gravel would steal all the flow. To compensate for this, a resistance element, like a needle valve (see FIG. 16), may be placed inline with a flowmeter to allow the flow to be equalized to each point. The capacity to main a pressure at the wellhead is simultaneously measured by a pressure gauge.

2. By comparing flow and pressure, the performance can be checked with the original site test procedure. The wellheads are often installed at the top of the spargepoint to limit the number of individual lines back to the compressor/ ozonator. Placed in a wellhead, a vertical mount block flow meter cannot be easily read. To allow easy reading, a forty-five degree (45°) angle mirror was installed and the scale printed in mirror image to allow for easy reading. (See FIG. 16.)

GROUNDWATER MOUNDING: EMPLOYMENT OF ZONE CONTROL

During the pilot test a noticeable rise in groundwater levels should occur. The phenomenon of groundwater mounding occurs when a fluid is introduced into soil in unconfined sandy aquifers. Small bubbles displace an equivalent volume of water creating a movement of water horizontally and vertically. (See FIG. 18) Hantush (1976) and Fielding (1981) have developed equations to depict two-dimensional behavior of groundwater in a constant-recharging system. Assuming a radial flow of bubbles in an aquifer of thickness (D), the head distribution can be represented as:

TABLE 7

$$(hm - hx) = \frac{Q_o}{2K_g(D + hx)}$$

where
$K_g$=bubble conductivity of aquifer
(hm-hx)=pressure head (ft)
m=maximum water rise (ft)
D=depth of aquifer
$\pi$=pi, a constant (3.14 . . . )
$Q_o$=gas outflow (cfd)
x=distance from source (ft)

In a theoretical depiction, the introduced bubbles exit the sparge point and migrate vertically resulting in a symmetrical spheroid shape. In reality, circular regions rarely are found. More commonly, an elliptical region is found, reflecting higher hydraulic conductivity in one axis than another, inherent with the depositional history of the formation. See FIG. 19 for a depiction of groundwater mounding caused by sparging.

DYNAMIC NATURE OF MOUNDING

Figure 18:
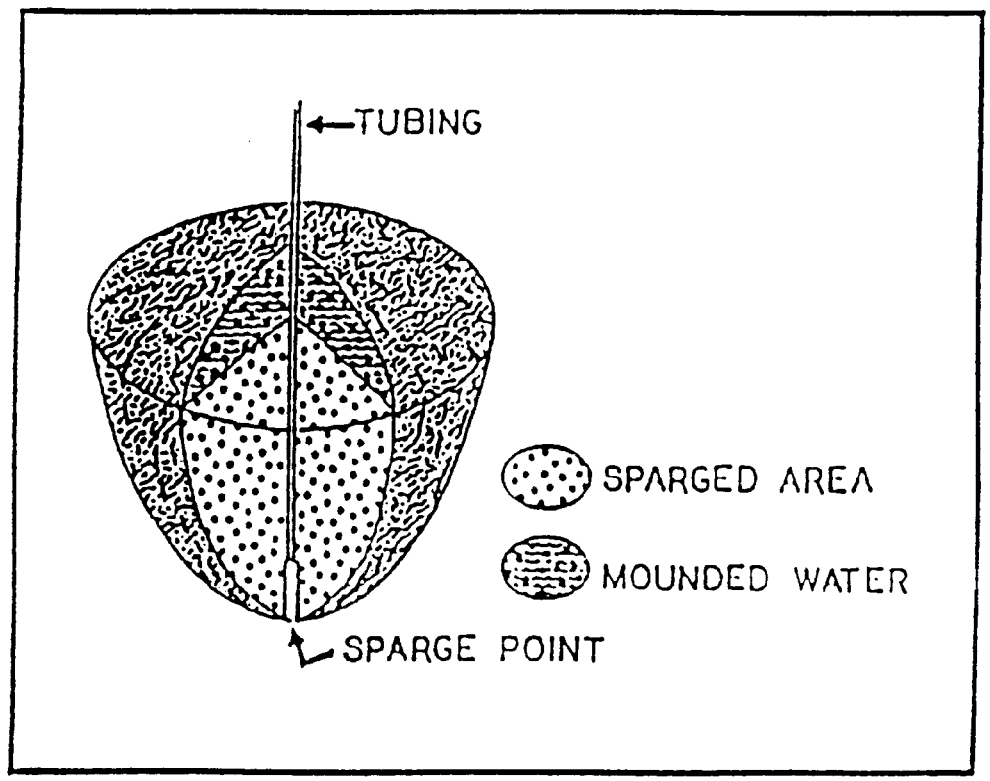
FIG. 18 is a schematic illustration of depiction of bubble zone and mounding.

Air introduced into a saturated zone raises the water level because the additional air displaces water from the saturated pore spaces. As the air moves toward the vadose zone, contaminants are stripped and moved out of the saturated zone and into the vacuumed zone. When the air stops and sparging ceases, the water level drops. In the event that there is any floating product on the water surface, mounding from added air could accelerate contaminant movement. Such product movement, real or perceived, creates regulatory problems. Reference is made to FIG. 18 and to FIG. 19. A properly designed sparging system using sequential air supply to sets of sparging points can contain any contaminant movement by using water mounding. The hydraulic gradient changes with mounding and any groundwater flow may be controlled.

BUBBLE ZONE RADIUS AND DISTRIBUTION

As with mounding, it is often convenient to think of bubble movement as being symmetrical and circular. In reality it is rarely so uniform. However, there are some general findings which can serve as guidelines in interpreting results of the bubble tests. First of all, bubbles in a more uniform sandy deposit move upwards at about a forty-five (45°) angle when released at critical bubbling pressure. Doubling the depth doubles the radius. Unfortunately, stratified deposits may also be encountered which may divert bubble vertical movement.

For every doubling of pressure above critical bubbling pressure, the radius of influence will expand 1.42 times its original radius. This approximation is based upon maintaining a fixed thickness of aquifer while doubling the volume of the cylinder. An approximation of the relationship between depth, radius and pressure for a medium to fine sand is presented in FIG. 20.

ZONE SPARGING IN MULTIPLE ZONES WITH ONE SYSTEM

The simplest sparging system attaches ten or twenty sparging points to one gas supply. The individual flow controllers adjust each sparging point for even air flow and sparging. A zone control system adds an electronic or mechanical programmable timer that opens and closes valves to direct the air supply to the appropriate manifold. The zone control is added to the system to expand the system and improve control of the sparging. Sequential periods of aeration improves the sparging action and expands the capabilities of a single air source for the system. If for example, one sparge system can provide adequate gas supply to 10 sparge bubblers, zone control can increase this to 20, 30 or more.

PRODUCT MIGRATION CONTROL THROUGH ZONE SPARGING

Figure 21:
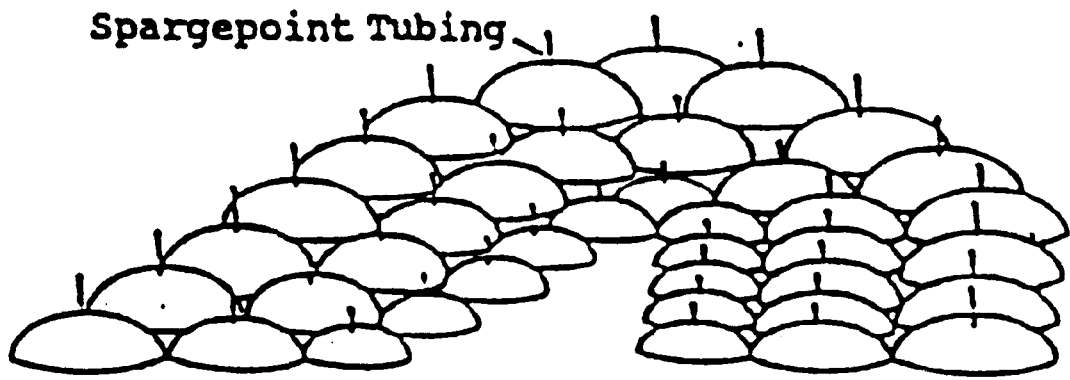
FIG. 21 is an illustration of sequential rise in water table from bubbling and concentric zones to permit containing any floating contaminant.
Figure 22:
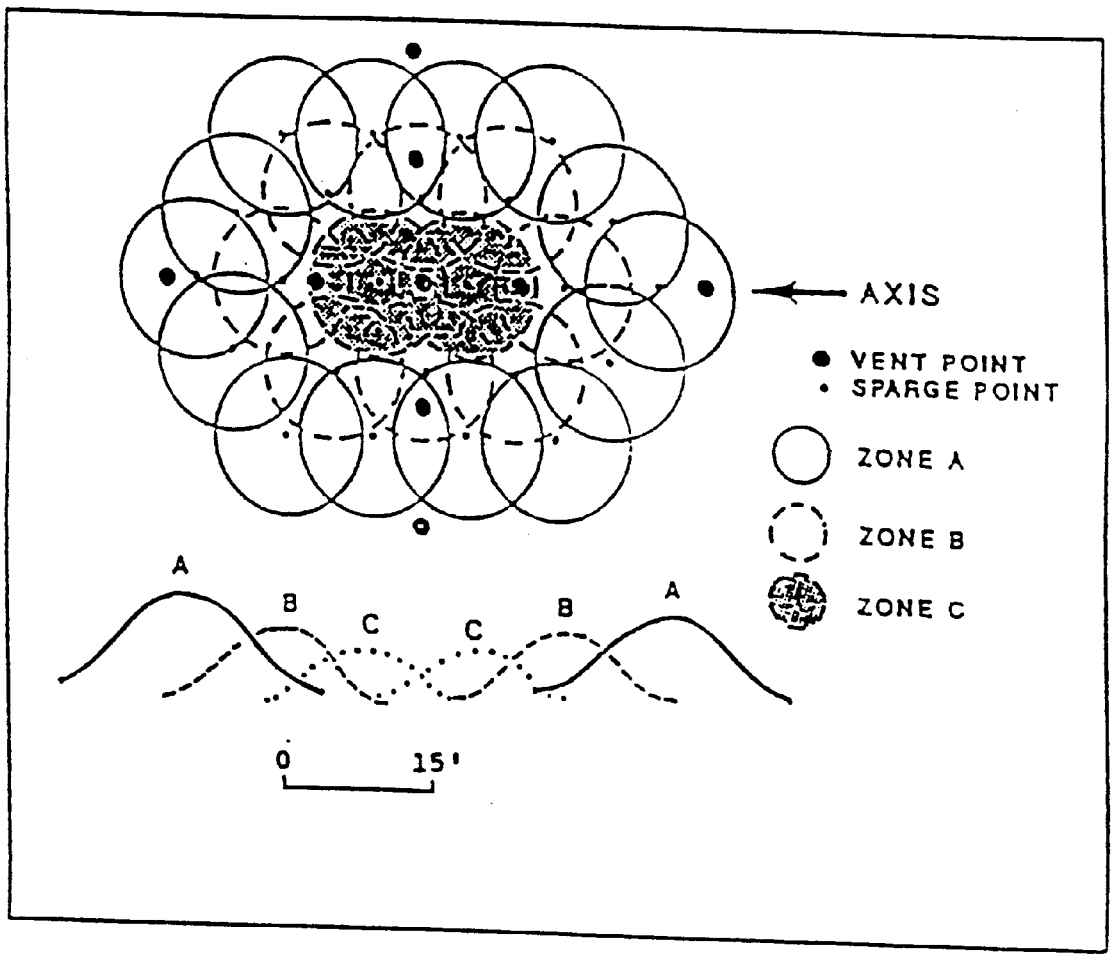
FIG. 22 is a schematic illustration of sequential rise in water table from bubbling.

If the potential of product migration exists, a design for controlling the movement of floating product off-site is accomplished by sequential sparging using discrete zones of sparge points. Stylized illustration of such a system (FIGS. 24, 25) shows that an outer ring of sparge locations provides a barrier for outward migration of contaminants by concentric mounding focused toward the center. Control of the height of water mounding through the length of time of sparging or pressure/air volume control per sparge locus serves to push any floating product in a predictable direction, toward extraction wells. Using sequential timing and air volume control is an effective strategy for product migration abatement. Reference is made to FIG. 21.

Concentric zones of sparging centers, activated for different lengths of time and volumes of air, will form a barrier to off-site product migration. A contaminated region with overlapping zones of sparging contains a plume, (see FIG. 26). The midpoint of zone A is located just outside the contaminated zone. The sequence of sparging involves first zone A, then zone B, and finally zone C. Greater volume and/or duration of sparging in zone A forms a barrier ridge, forcing product toward the center of zone C.

Figure 19:
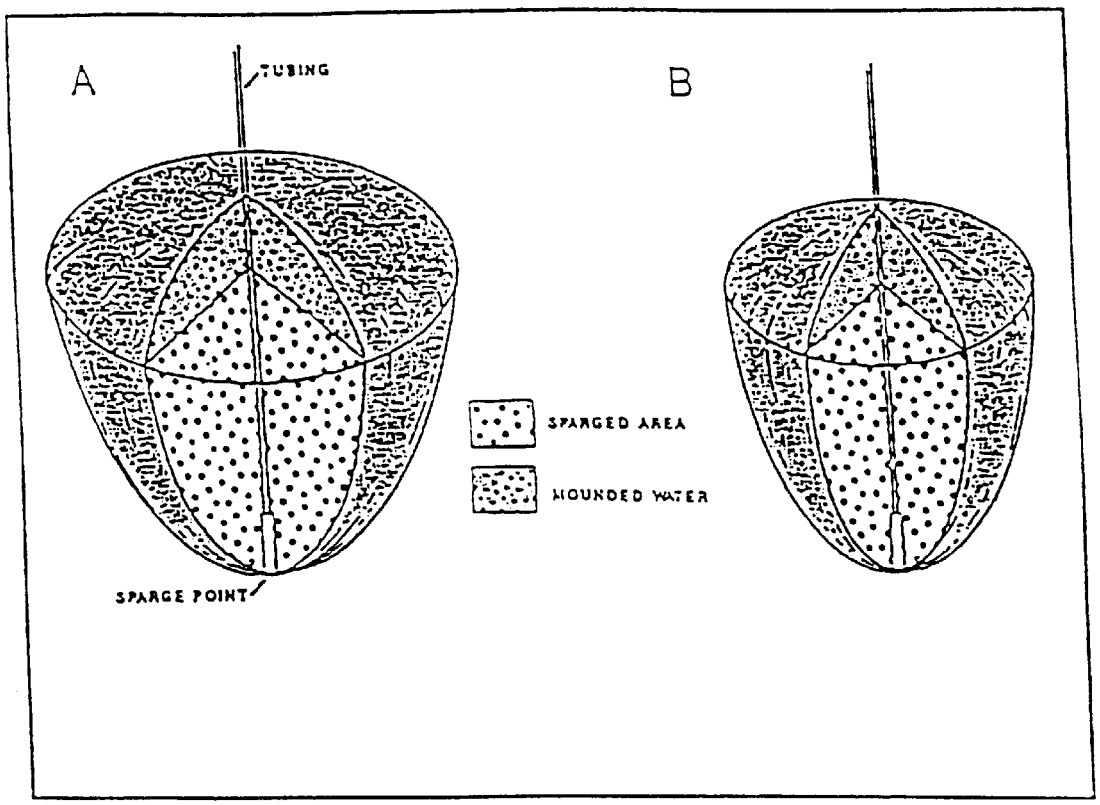
FIG. 19 is a schematic illustration of bubble zone and mounded area above an active aeration zone.
Figure 20:
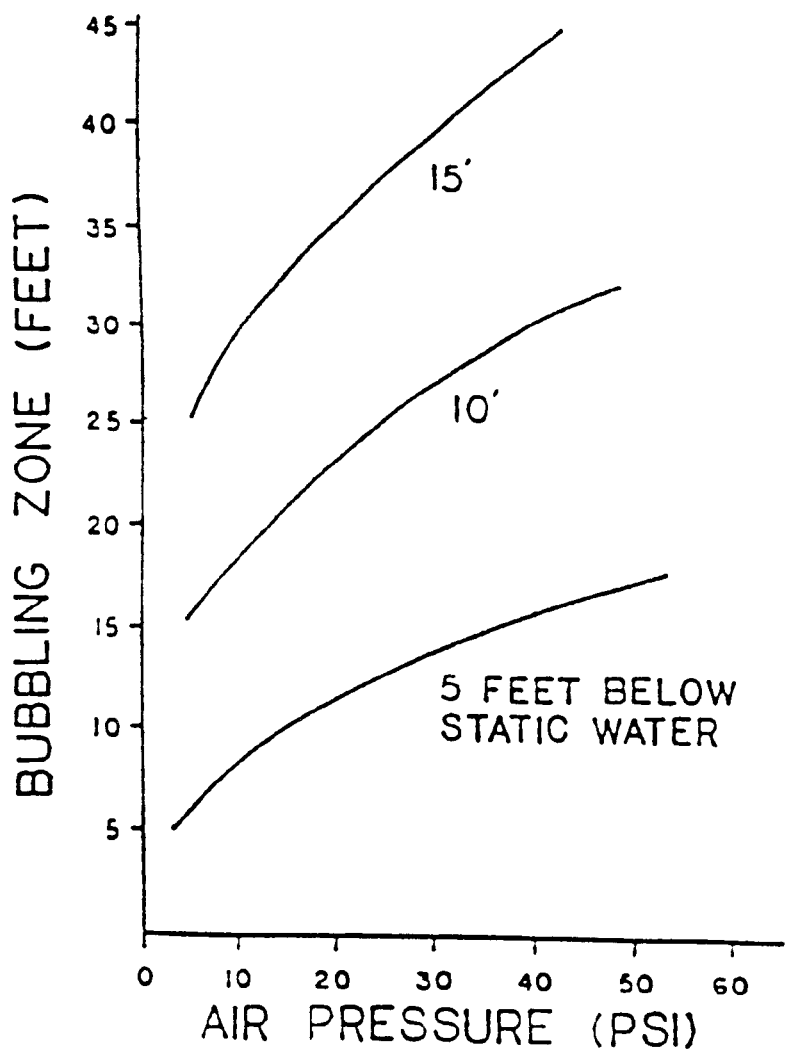
FIG. 20 is a graphic illustration of the relationship between bubble zone width, depth of spargepoint and pressure for a medium sand aquifer.

Individual sparge point effects are shown graphically on FIG. 19 as the location of introduced bubbles in the saturated zone. The shape of the bubbled zone is composed of the original groundwater zone plus an area above static water level where water is mounded and is governed by the air pressure and volume. Higher pressure and greater volume gives a wider diameter of influence while lower pressure and lower volume influence a smaller diameter area. Overlap of these affected areas increases the thickness of the uniformly sparged areas, decreasing the areas missing the introduction of air. If there is a natural groundwater flow and directional transmissivity in an aquifer, then the sparged zone becomes distorted downgradient and non-uniform in diameter. The more knowledge available of the water bearing zone, the more likely it is to predict the effects of sparging and control them. The sparged area then actually becomes a barrier inhibiting contaminant migration

DEGREE OF OVERLAP OF BUBBLE ZONES

Two important reasons exist which support overlapping sparge point zones of influence: 1) even distribution of the aeration and gas transfer in sparging, and 2) elimination of vertical gaps in the treated areas. While a two-dimensional set of circles can be arranged in a triangular or rhomboid configuration with circumferences touching, the region within is not equally saturated with air bubbles. From a single source, bubbles are ejected outwards. Their density decreases exponentially with distance in a uniform media. Overlapping sparging centers compensate by increasing the bubble density in the outer regions of influence where the number of bubbles are smaller.

In a three-dimensional perspective, the spacing of the sparging points leaves gaps between the conical zones where the bubbles rise. The closer the points, the smaller the stagnant zones become. Overlap in the vertical as well as horizontal dimension tends to create eddies of groundwater as well as promote gaseous transfer from entrapment in the saturated formation to rising bubbles of introduced air. FIG. 23A contrasts a non-overlapping condition with an overlapping array of sparging points.

THE USE OF ALTERNATING (PULSE) PUMPAGE AND BUBBLE INJECTION PURPOSE

If a spargepoint is placed within a well, the microbubbles will not penetrate into the formation. By placing an inverted submersible pump with a pneumatic packer to alternately pump the well volume water containing the microbubbles out into the formation allows the spargepoint to be installed in an existing elongate well screen.

The function of the inverted pump also adds two additional advantages to normal microbubble production: 1) The periodic outwards pressure enlarges the bubble radius over that of a microporous point alone and, 2) the alternating of water pulsing after bubble production decreases the formation of air channels which tend to enlarge with continual air injection. Plugging the forming channels with water resists the re-entry of air, producing far more channels, the pathway varying in time.

USE OF A PHYSICAL ARRANGEMENT OF SEQUENTIALLY ARRANGED SPARGEPOINTS INSTALLED AT AN ANGLE

Figure 27:
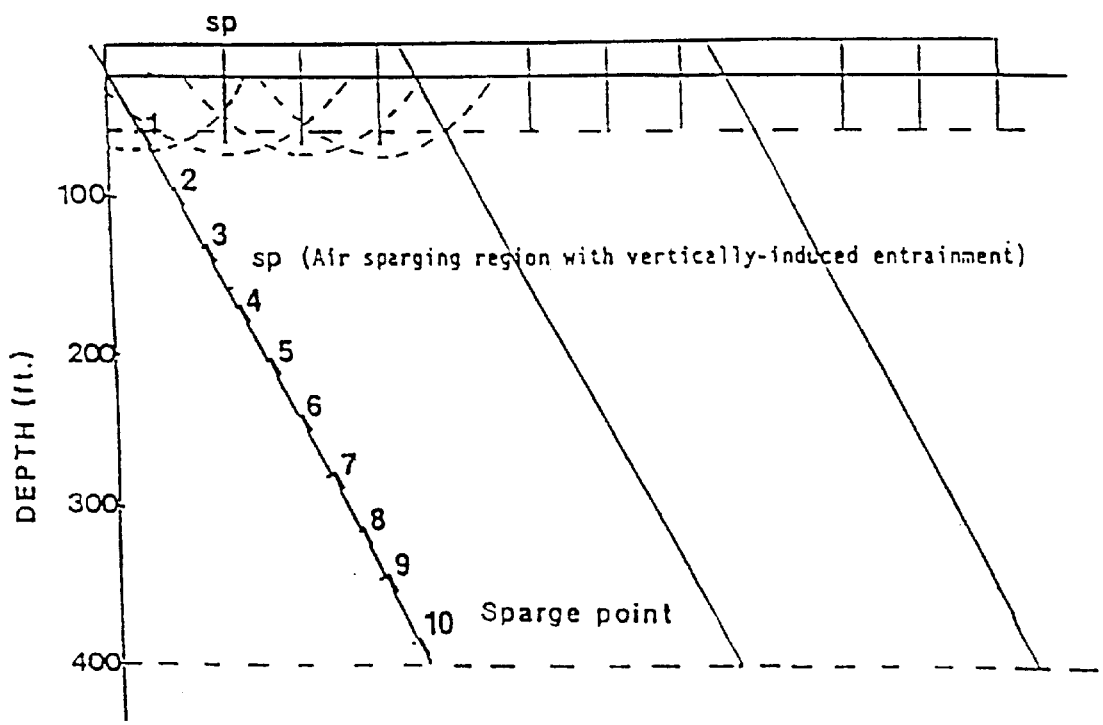
FIG. 27 is a cross sectional schematic illustration of deep slant-well installations to create selective bubble fence using equal spacing of ten difffusers.
Figure 28:
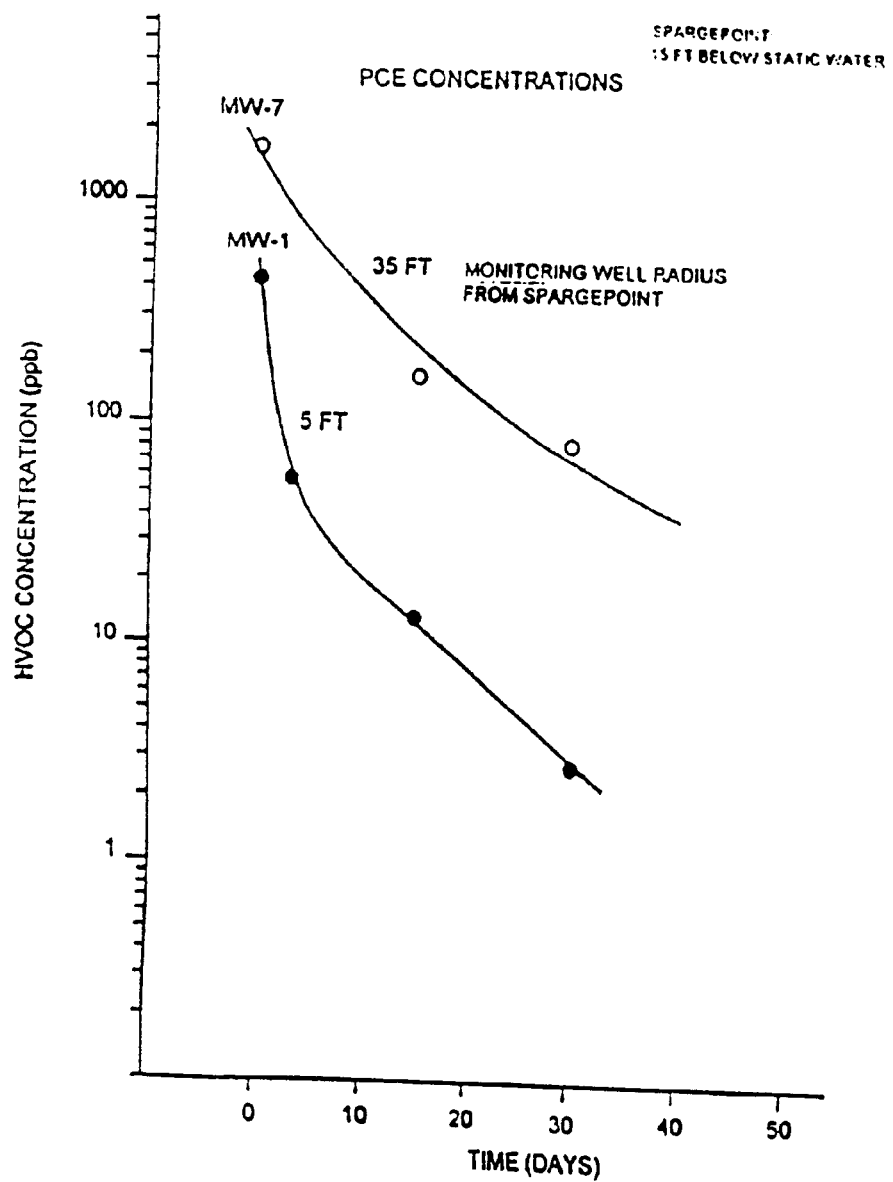
FIG. 28 is a graphical illustration of PCE concentrations.
Figure 29:
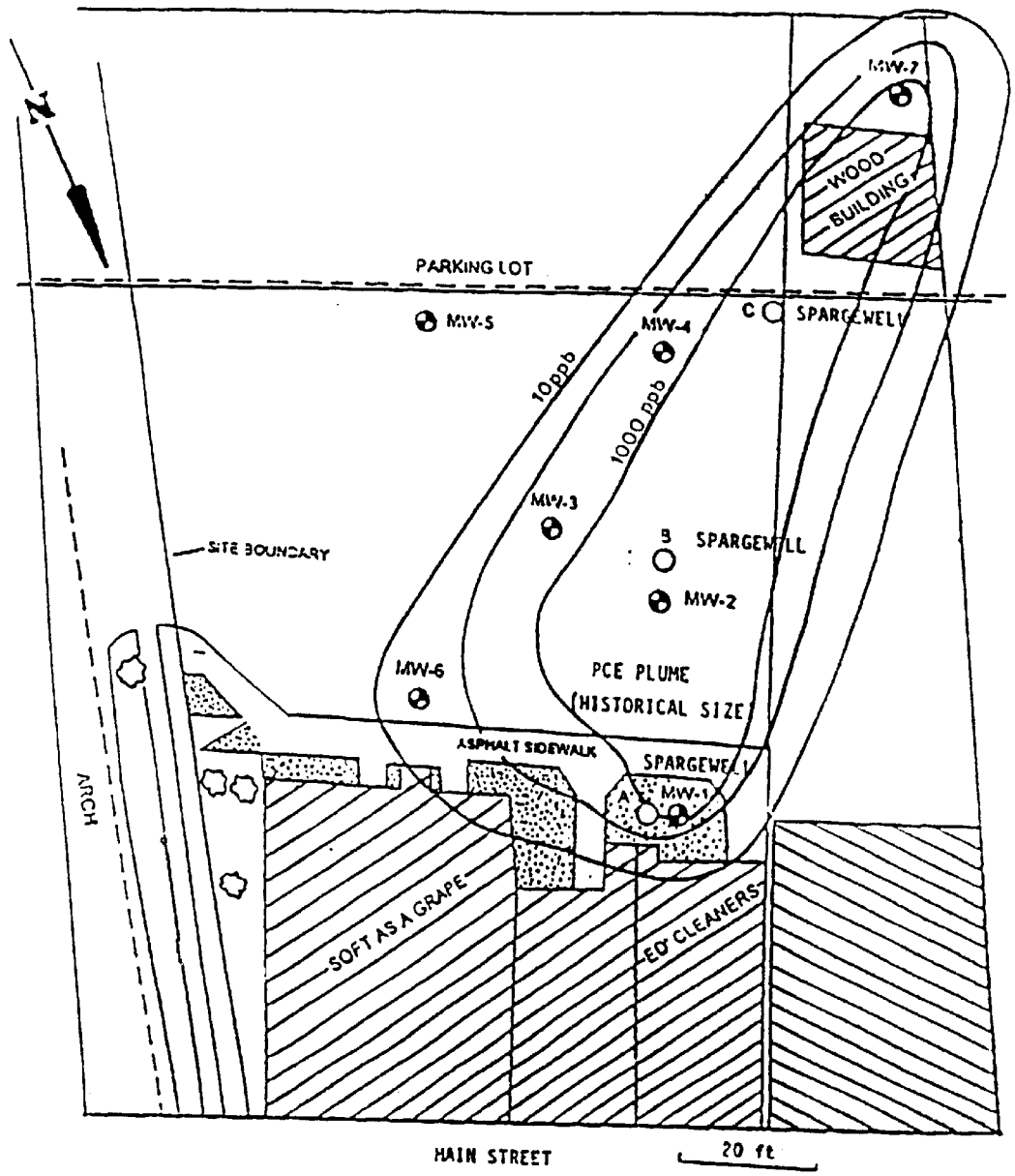
FIG. 29 is a site map an area of contamination.

Referring to FIGS. 27–29, the use of angled straight boring for sparging allows unique effects ideal for treatment of groundwater plumes of petroleum based volatile organics or volatile solvents. Increasing the depth below static water directly increases the radius of bubbling, creating a natural widening of the bubble zone. With an inclined well, multiple bubblers can create a broadening pattern from dense to diffuse with distance. By overlapping the slanted installations, a three-dimensional bubble "fence" is created by the staggered placement of bubble emitters. Zoning, i.e., differently turning on one level versus another, can be used to enhance vertical groundwater circulation or introduce separate gas combinations in a spatial array.

To develop this technique, microporous bubblers had to be modified to allow independent pressure and flow control, yet high volume flow. This was obtained by having flow through conduits installed in porous bubblers. The microporous materials create air bubbles which are sized to pass through sandy soils as a fluid. A special stepwise transition into a fracturing (channel-forming) condition at excessive pressures. The slantwell installation can be performed by any hollow-stem drilling rig which can angle drill. Angles from roadways, or intercept trench applications.

SLANT ANGLE POSITIONING

Instead of arranging sparge points at a fixed depth, the boring can be angled to allow multiple spacings. This is different from directional horizontal drilling, in that the hole remains straight, but is inclined. First employed to allow sparging under buildings, the concept has far wider application, particularly to adjusting bubble density to contaminant concentration in dispersing plumes and in the construction of bubble fences.

CONCEPT OF EFFECTIVE ENVELOPE

In order to understand the basis for three-dimensional bubble dispersion, the following must be visualized. Sources with identical flow placed at varying depths will eject bubbles outwards in a parabolic manner. As the bubbles rise, they will first disperse, the distance between bubbles gradually broadening. The bubbles will enlarge their diameters as the pressure decreases towards the water table. Once the size of the bubble enlarges to substantially greater than the pore size of the stratum, the bubble no longer acts as a fluid passing through the pores, but tends to form channels. The channeling may allow faster rise of the bubbles to the surface, but interferes with their ability to diffuse through the stratum. In the upper regions of a bubble zone, even though the diameter of the zone has enlarged, the effectiveness of gas transfer has substantially diminished.

For example, a diffuser placed at 100 feet below static water releases 50 micron bubbles into a medium-sand aquifer under a pressure of 60 psi. The diameter of the bubble increases to the cube root of the pressure decrease. By the time the bubbles have ascended to 50 feet they are 1.2 times larger. At 25 feet, they are 1.4 times larger. At 10 feet, the bubbles have expanded to 2.2 times larger. The optimal diffusion zone ranges from 100 to about 25 feet, assuming no coalescing with other bubbles occurs.

In three dimensions, there exists an effective envelope (or zone) for optimal gas transfer. This region can simply be referred to as the region where the bubble diameter is maintained at less than mean pore size. Beyond this range the vertical transport becomes dominant, transferring the contents of the bubble to the surface, but the gaseous exchange with the soil/water matrix is substantially reduced.

Counter to what one might initially assume, placing sources well below a plume region to allow for a greater bubble diameter could be counter-productive if, when the bubbles make contact with the contaminated soil/water region, the bubbles are in their ascension phase rather than diffusive phase.

In the case of a contaminated plume of water which is being depressed with rainwater recharge and whose leading front is dispersing outwards, the slant angle drilling can be very efficient. The shallow emplacement produces a concentrated density of bubbles where the contaminant source is strongest. Downgradient, the deeper spargepoint diffusor creates a broader zone to correspond to the broader, but less concentrated, plume region (see FIG. 18).

MULTIPLE INSTALLATIONS

One of the most intriguing applications of slant angle emplacements is to create deep "bubble fences". By offsetting parallel installations such that the distance from the second to the first is less than the horizontal surface-projected length of the first (i.e., they are overlapped), a bubble zone is created laterally. The degree of overlap vertically can adjust the total bubble density per surface area.

Figure 26:
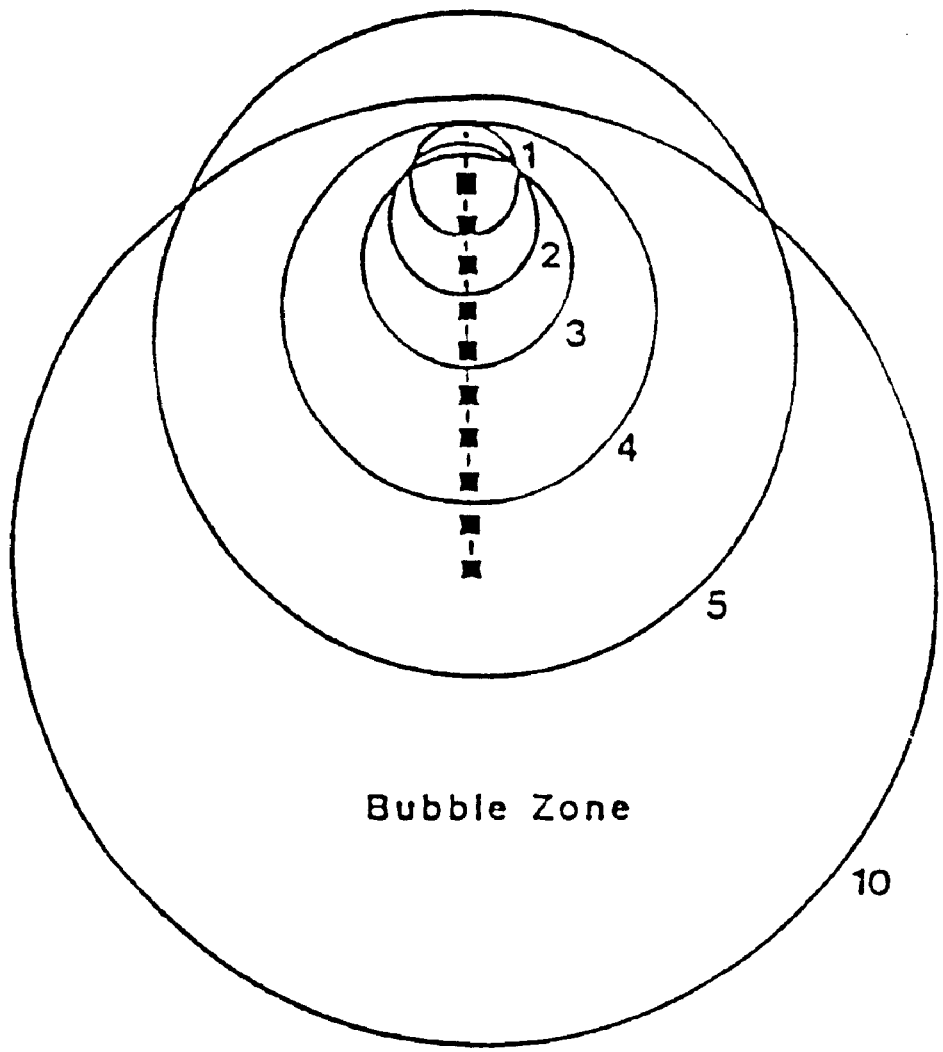
FIG. 26 is a top view of a ten point diffuser installation.

One interesting effect of the overlapping is likely to be the creation of a centralized region of intense stripping of volatile organics (see FIG. 26). The simultaneous injection of ozone then operates a three-dimensional zone of extraction and decomposition of certain organic compounds by rapid decomposition and slow vertical movement, the vapors will not be reversibly released when they enter zones of lower organic concentration (i.e. overlying concentration "clean water"). Finer bubbles, as they start to expand, may intersect larger bubbles with higher vertical velocities, aiding in transport to the surface. The vertical location of sparge points can be modified to concentrate the bubbles' effective envelopes in the vicinity of a known plume region, instead of an even distribution of sparge points throughout the groundwater column. A logarithmic distribution (towards the static water zone) may be more appropriate for a shallow plume region.

INSTALLATION METHODS
PASS-THROUGH DIFFUSERS

With porous cylinders which have flow-through connections, up to three bubblers can be connected with half (½) to one (1) inch PVC pipe. The sections are lowered into a hollow stem auger similarly to a monitoring well. For one (1) inch or less diameter sparge points, a four (4) inch hollow stem auger is sufficient. To avoid sand heave, water is usually added to the hollow stem up to slightly above static water. Distilled water may be placed in the sparge point array to avoid reflux of contaminants during flooding. A sand pack equivalent in size to the mean particle size of the formation is desirable. Sand packing to two (2) feet above the screens allows a little margin of error for a bentonite pellet or grout seal of about two (2) feet in depth above the sand pack. A drop weight may be used to check the sand pack before pellet release.

MULTIPLE BUNDLES

A recent alternative for deep emplacements involves bundling the sparge points with individual connecting tubes. The tubing is run across the outside of the sparge points and radially twirled around the other rising tubes. With the use of a six (6) inch hollow stem auger, the furthest point can be attached to steel pipe and the remaining tubing spirally wrapper around it for support. Each tube leads to a separate wellhead control assembly at the surface completion.

CONCLUSIONS

A descending series of sparge points can be spaced along a slantwell installation to produce unique bubble distributions. The overlapping of the slanted sections allows a bubble barrier to be constructed across the path of a contaminant plume to significant depths. A dense, overlapping stripping zone would be produced without having to bring the end shaft of the drilled hole back up to the surface.

The use of larger porous materials with higher volumes of flow can create stripping and decomposition zones over 100 feet (30m) in width where organic compound removal occurs before the bubbles ever enter shallow waters. The relationship between depth, pressure, and effective bubble radius is presented with a few simple equations. Multiple installations can be used for volatile organic in-situ stripping as well as oxygen transfer for biodegradation. Reference is made to FIG. 27.

Heretofore, treatment of PCE, TCE, DCE plumes have required expensive equipment, groundwater pump and control, air strippers, offgas emissions treatment. Treatment with the C-Sparger requires only a small (70 lb) 3×233 1 ft. box containing an ozone generator, compressor, cooling fan, pump controller and sequencer (solenoid bank and its controller). The tremendous increase in efficiency of the microporous bubble extraction/oxidant gas combination allows this downsizing to the point where the entire system can operate on household current (120V, 15 AMPS). It can operate up to four special sparging wells each with a microporous diffusor and pulsing (agitator) pump. The treatment area normally covers a region 60 ft. wide by 200 ft. long by 15 ft. deep.

The internal controller allows the system to be preset to on/off cycles for each in-well system allowing a cycle of pulsed operations which allows a high degree of removal efficiency. The ozone/air stream is preset at a concentration matching the observed dissolved molar concentration of PCE to allow a molar concentration of PCE to allow a theoretical five (5) day removal. The air/ozone compressor lines are coded A, B, C, D for the respective wells. The pulsing pump power (12 volt) lines are coded a, b, c, and d. A common sequence is:

A (10 min.), a (3 min.); B (10 min.), b (3 min.; C (10 min.), c (3 min.); D (10 min.), d (3 min.)—requiring 52 minutes to complete one cycle. Up to 12 cycles are performed per day, amounting to 624 minutes out of 1440 minutes of the day.

The time on for the pulsing pump (a) is set to the time necessary to remove one volume of water existing beneath the pneumatic packer and bottom of the screened well. This assures a total replacement of the water volume each cycle.

The timing sequencer can be set to respond to an achieved level of ozone in the recirculating water as an alternative means of controlling the time between inwell stations. An inwell sensor feeds a current back to the controller in the main box which signals the relay to advance when a level is reached in the water above the packer in the special well unit.

FIG. 29 shows a treatment system set up behind a drycleaners in Falmouth, Mass. Here one unit (A) is doubled up (contains two bubblers, one below and one within the inwell unit). Two other satellite inwell units exist at B and C. The depth to static water is 15 ft., the depth of the in-well unit is 15 ft. below static level (5 ft. screen, 5 ft. casing, 5 ft. screen) with a 2 inch spargepoint placed 5 ft. below the unit.

FIG. 28 shows the rate of removal of tetrachloroethene achieved during treatment onsite. Note that the unit achieves a 1000 ft/d drop in PCE content within 60 days. The zone of influence of treatment extends beyond a 35 ft. radius. From Tables of Analyses, note that the three dissolved chlorinated solvents: Tetrachloroethene (PCE), Trichloroethene (TCE), and 1, 2, Dichloroethene (DCE) all decrease concomitantly. All three are oxidized simultaneously without the compounds being shifted from one (PCE) to another (TCE) breakdown product as is common to anaerobic digestion by microbial activity.

The present invention also includes a method for removal contaminants from soil and an associated subsurface groundwater aquifer by injection of air into an aquifer using microporous diffusors and duo-gas systems without vacuum extraction, comprising the steps of: a) providing microporous diffusors in lieu of standard slotted well screen to improve bubble dispersion through soil and improve rate of gaseous exchange; b) performing a site test to confirm suitability of soil on the site, fluid acceptance range and critical operating range to avoid fracturing, and region of influence; c.) employment of microfine bubbles to extract volatile dissolved PCE, TCE, and DCE while encapsulated ozone decomposes them, d) employment of gas mixture (air/ozone) to fill microbubbles to allow a rapid decomposition of certain volatile organic carbon compounds (VOC's) extracted from the groundwater; e) selectively pulling volatile organic compounds (VOC's) into the small bubbles; f) simultaneous extraction/decomposition of certain organic compounds with high Henry's constants by matching the time of exposure for decomposition to the vertical travel time of the bubbles avoids the need for vapor recovery since the VOC's are decomposed before reaching the unsaturated soil zone; g) employment of specially-designed wellheads to equalize injected flow between formations of differing permeability, h) employment of zone control bubble zone overlap and periodically pulsing to improve dispersion area of influence and avoid movement of floating product; i) The use of alternating pumpage and bubble injection to maximize dispersal of bubbles within and outward from specially-designed well casing; j) Use of a physical arrangement of sequentially arranged spargepoints to form a slanted angle while maintaining independent pressure and flow control to each wherein the employment of a, b, c, d, e, and f simultaneously in an extremely miniaturized efficient removal system at one tenth the cost of existing systems, one tenth the maintenance cost and capable of reduction of PCE to a concentration of one tenth the original level per week, and capable of treating a region up to 50 ft. wide by 200 ft. long to drinking water standards (less than 5 ppb), within one month from start time, staring with initial concentrations of dissolved PCE, TCE, or DCE at or slightly above 1000 ppb and reaching less than 5 ppb.

TABLE 8

LABORATORY ANALYSES TAKEN BEFORE AND DURING TREATMENT CONCENTRATIONS OF HVOC'S (PCE, TCE, and DCE) IN MW-1 AT ED'S CLEANERS

| Time | PCE | TCE | as −1 DCE |
| --- | --- | --- | --- |
| 12/29/95 | 430 | 50 | 14 |
| 2/2/96 | 11 | 2 | 2 |

What is claimed is:

1. Apparatus for injection of a gas into aquifer regions, comprises:
   a gas generator that generates gas for injection into the aquifer;
   a casing;
   a packer disposed through the casing;
   an air injection passageway disposed through the packer and coupled to the gas generator;
   a pump disposed within the casing and having an inlet above the packer and an outlet below the packer;

an outlet screen coupled to the casing; and a microporous diffuser coupled to the gas generator, said microporous diffuser including a body having a porous portion with a pore size less than about 200 microns.

2. The apparatus of claim 1 wherein the outlet screen has a pore size in a range less than about 200 microns.

3. The apparatus of claim 1 wherein the outlet screen has a pore size in a range between about 20–50 microns.

4. The apparatus of claim 1 wherein the outlet screen has a pore size in a range between about 5–20 microns.

5. The apparatus of claim 1 wherein the microporous diffuser has a pore size in a range between about 5–200 microns.

6. The apparatus of claim 1 wherein the microporous diffuser has a pore size in a range between about 20–50 microns.

7. The apparatus of claim 1 wherein the microporous diffuser has a pore size in a range between about 5–20 microns.

8. The apparatus of claim 1 wherein the outlet screen is coupled to the casing at a lower portion thereof and with the apparatus further comprising:

an inlet screen coupled to the casing at an upper portion of the casing.

9. The apparatus of claim 8 wherein the casing and apparatus are disposed within a well, the well provided on a site having an aquifer, and with the outlet screen disposed in the aquifer and the inlet screen disposed to circulate water back into the well towards the outlet screen.

10. The apparatus of claim 9 further comprising:

a pump control unit to pulse water out of the outlet screen after formation of bubbles to reduce channeling effects.

11. The apparatus of claim 9 wherein the well is a vertical well.

12. The apparatus of claim 9 wherein the well is disposed at a non-normal angle with respect to a ground level of the site.

13. The apparatus of claim 1 further comprising:

a compressor coupled to the gas generator to provide the gas to the outlet screen and the microporous diffuser at an elevated pressure.

14. The apparatus of claim 1 wherein the microporous diffuser is coupled to the gas supply and disposed outside of the casing.

15. The apparatus of claim 1 wherein the microporous diffuser is coupled to the gas supply and disposed within the casing.

16. The apparatus of claim 1 wherein the microporous diffuser is a first microporous diffuser disposed within the casing and wherein the apparatus further comprises:

a second microporous diffuser coupled to the gas supply and disposed outside of the casing.

17. The apparatus of claim 16 further comprising a material pack of porous materials disposed about the second microporous diffuser.

18. The apparatus of claim 16 further comprising an impervious packing of grout or bentonite disposed between the casing and the second microporous diffuser.

19. The apparatus of claim 16 further comprising an impervious packing of grout or bentonite disposed between the casing and the second microporous diffuser; and a material pack of porous materials disposed about the second microporous diffuser.

20. A well casing, comprising:

a well-screen diffuser disposed to form part of the casing, said well-screen diffuser having a porosity in the range of about 5 microns to 200 microns.

21. The well screen of claim 20 wherein the casing is cylindrical.

22. The well screen of claim 20 wherein the porosity range is between about 50–200 microns.

23. The well screen of claim 20 wherein the porosity range is between about 20–50.

24. The well screen of claim 20 wherein the range is between about 5–20 microns.

25. Apparatus for injection of an air/ozone mixture into aquifer regions, comprises:

a gas generator that generates ozone gas for injection of the air/ozone gas into an aquifer;

a microporous diffuser coupled to the gas generator, said microporous diffuser comprising:

a tubular body having a pore size that is matched to pore size of surrounding material that the microporous diffuser is introduced into.

26. The apparatus of claim 25 further comprising:

a well casing;

an air injection chamber provided in the well casing and coupled to the gas generator comprising:

a packer disposed in the casing;

a pump disposed in the casing and having an inlet through the casino above the packer and an outlet through the casing below the packer;

an outlet screen coupled to the casing and disposed to produce fine bubbles of air/ozone, said outlet screen having a pore size in a range of about 5 microns to 200 microns.

27. The apparatus of claim 26 further comprising a material pack of porous materials disposed about the microporous diffuser.

28. The apparatus of claim 26 wherein the tubular body of the microporous diffuser has a pore size in the range of 5 to 200 microns.

29. The apparatus of claim 26 wherein the tubular body of the microporous diffuser has a pore size in the range of 20 to 50 microns.

30. The apparatus of claim 26 wherein the tubular body of the microporous diffuser has a pore size in the range of 5–20 microns.

31. The apparatus of claim 26 further comprising:

a casing within which is disposed the pump and the packer, with the casing having the outlet screen at a lower portion thereof, and with the apparatus further comprising:

an inlet screen at an upper portion of the casing.

32. The apparatus of claim 31 wherein the casing and apparatus is disposed within a well, the well provided on a site having an aquifer, and with the outlet screen of the bubble chamber being disposed in the aquifer and the inlet screen disposed to circulate water back into the bubble chamber.

33. The apparatus of claim 32 further comprising:

a pump control unit to pulse water out of the outlet screen after formation of bubbles to reduce channeling effects.

34. The apparatus of claim 32 wherein the well is a vertical well.

35. The apparatus of claim 32 wherein the well is disposed at a non-normal angle with respect to a ground level of the site.

36. The apparatus of claim 26 further comprising:

a compressor coupled between the gas generator and the bubble chamber and the microporous diffuser to provide the gas thereto under pressure.

37. The apparatus of claim 26 wherein the microporous diffuser is coupled to the gas supply and disposed outside of the casing.

38. The apparatus of claim 26 wherein the microporous diffuser is coupled to the gas supply and disposed within the casing.

39. The apparatus of claim 26 wherein the microporous diffuser is a first microporous diffuser disposed within the casing and wherein the apparatus further comprises:

a second microporous diffuser coupled to the gas supply and disposed outside of the casing.

40. The apparatus of claim 39 further comprising an impervious packing of grout or bentonite disposed between the casing and the second microporous diffuser.

41. The apparatus of claim 39 further comprising an impervious packing of grout or bentonite disposed between the casing and the second microporous diffuser; and a material pack of porous materials disposed about the second microporous diffuser.

* * * * *